United States Patent
Nakata

(10) Patent No.: US 8,850,459 B2
(45) Date of Patent: Sep. 30, 2014

(54) INFORMATION PROCESSING APPARATUS, INFORMATION PROCESSING METHOD, AND PROGRAM

(75) Inventor: Hiroaki Nakata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 149 days.

(21) Appl. No.: 13/430,386

(22) Filed: Mar. 26, 2012

(65) Prior Publication Data

US 2012/0254898 A1 Oct. 4, 2012

(30) Foreign Application Priority Data

Mar. 28, 2011 (JP) ................................. 2011-070370
Jul. 20, 2011 (JP) ................................. 2011-159010

(51) Int. Cl.
*G06F 13/10* (2006.01)
*G06F 9/44* (2006.01)
*G06F 7/00* (2006.01)
*G06F 3/12* (2006.01)

(52) U.S. Cl.
CPC ............ *G06F 9/4411* (2013.01); *G06F 3/1226* (2013.01); *G06F 3/1203* (2013.01); *G06F 3/1228* (2013.01); *G06F 3/1285* (2013.01); *G06F 3/1225* (2013.01)
USPC .......................................... 719/324; 700/219

(58) Field of Classification Search
CPC ............................... G06F 9/4411; G06F 9/541
See application file for complete search history.

(56) References Cited

U.S. PATENT DOCUMENTS

| 2008/0117452 | A1* | 5/2008 | Murakami | 358/1.15 |
| 2008/0231891 | A1* | 9/2008 | Nakata | 358/1.15 |
| 2011/0075176 | A1* | 3/2011 | Nishio | 358/1.13 |
| 2011/0261400 | A1 | 10/2011 | Saito | |

FOREIGN PATENT DOCUMENTS

| JP | 2005-135414 A | 5/2005 |
| JP | 2011-232938 A | 11/2011 |

* cited by examiner

*Primary Examiner* — Andy Ho
*Assistant Examiner* — Abdou Seye
(74) *Attorney, Agent, or Firm* — Canon USA, Inc. IP Division

(57) ABSTRACT

The present invention relates to an information processing apparatus, in which an operating system (OS) is executable in such a way that a component operable based on administrator's authority can realize installation of a device driver. The information processing apparatus includes a selection unit configured to select a peripheral device that serves as an output destination of a processing request if the processing request is received from a user via an application, and a management unit configured to control setting processing for a device driver applicable to the selected peripheral device to use the peripheral device. The management unit is configured to request a first component operable on the OS based on administrator's authority to perform setting processing for a device driver applicable to the selected peripheral device.

10 Claims, 20 Drawing Sheets

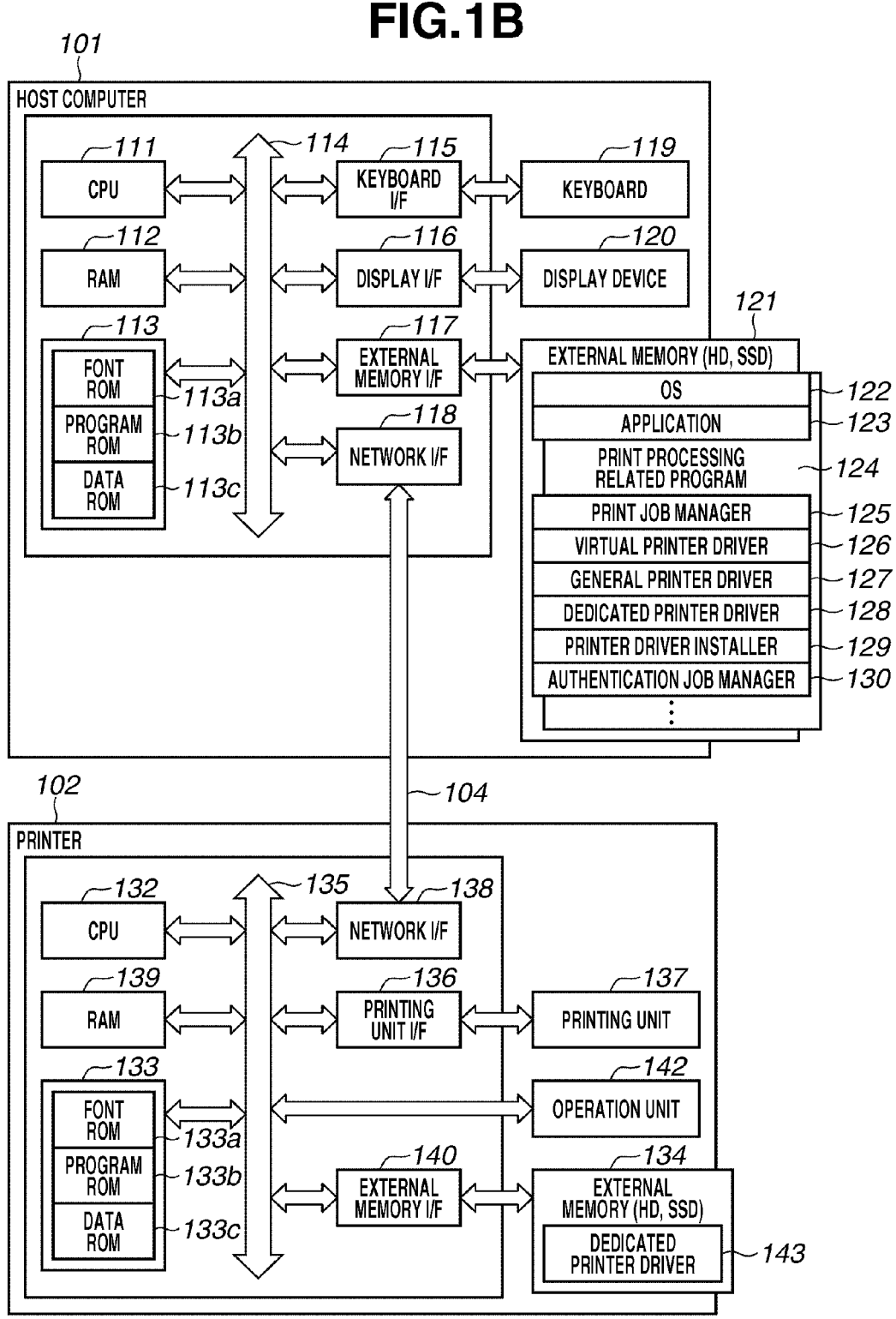

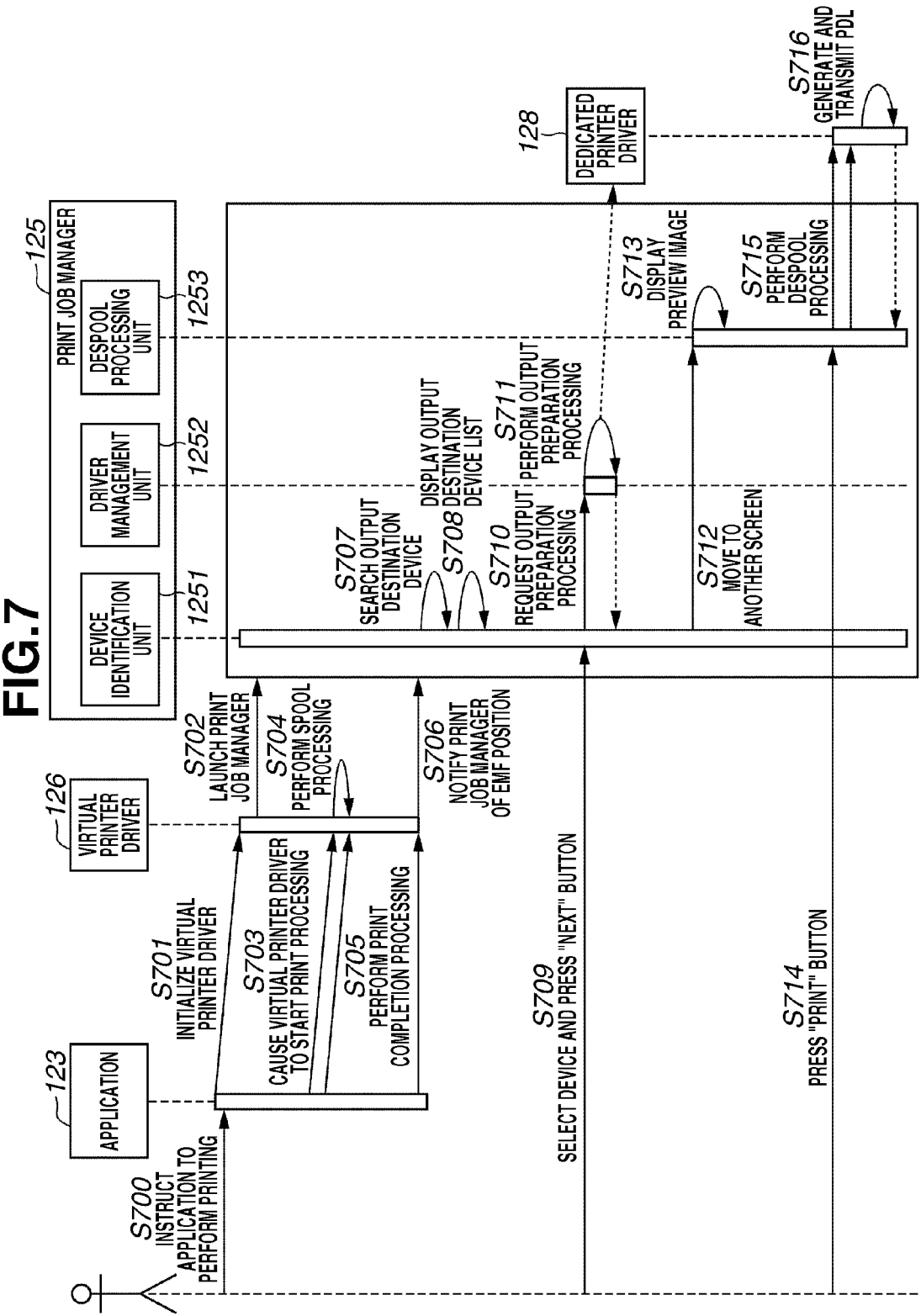

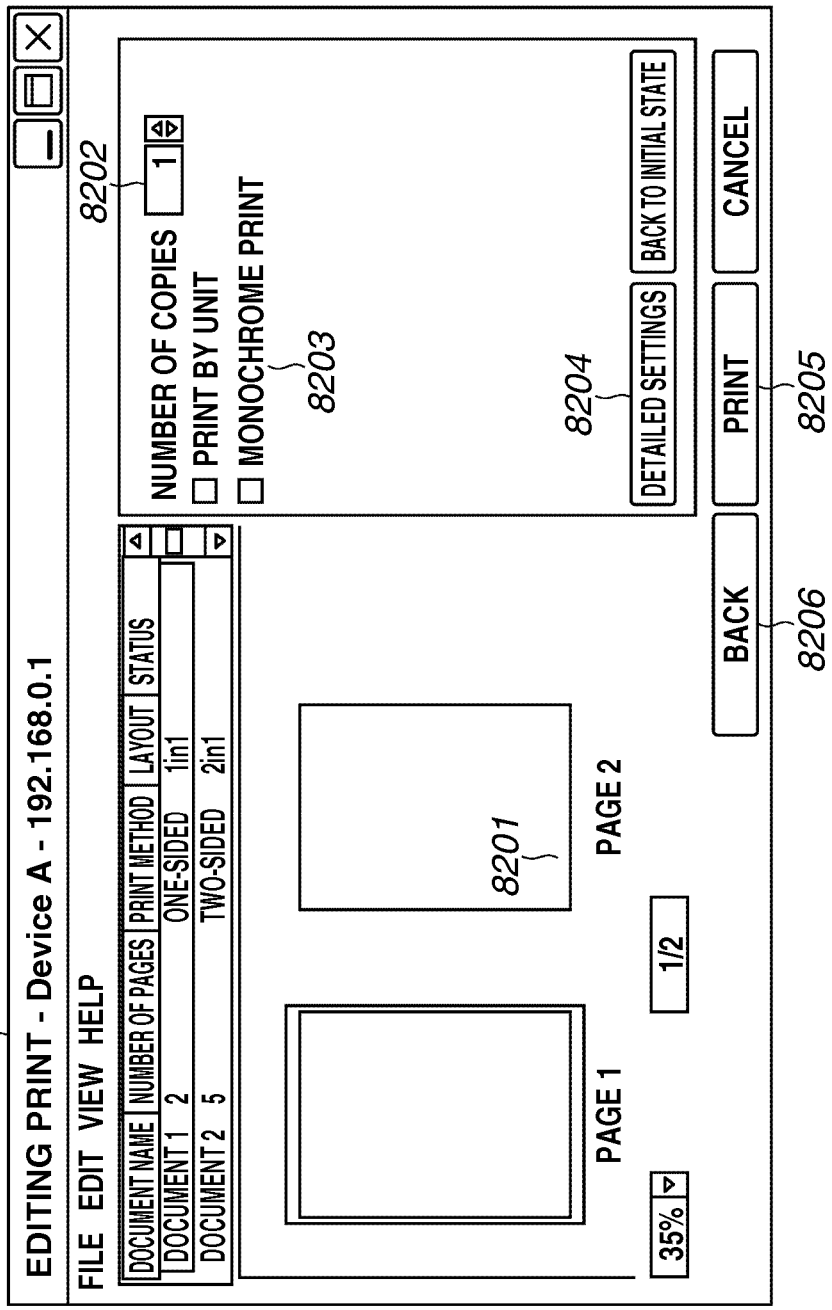

FIG.13A

```
<bidi:Set xmlns:bidi="http://schemas.microsoft.com/windows/2005/03/printing/bidi">
<Query schema="¥Printer. IHV. AddDriver:InffilePath">
<BIDI_STRING>¥¥drvserver¥storage¥prn001.inf <BIDI_STRING>
</Query>
<Query schema="¥Printer. IHV. AddDriver:ModelName">
<BIDI_STRING>Device Model A <BIDI_STRING>
</Query>
</bidi:Set>
```

FIG.13B

```
<bidi:Get xmlns:bidi="http://schemas.microsoft.com/windows/2005/03/printing/bidi">
<Query schema="¥Printer. IHV. AddDriver">
  <Schema name="¥Printer. IHV. AddDriver:ModelName">
    <BIDI_STRING>Device Model A <BIDI_STRING>
  </Schema>
</Query>
</bidi:Get>
```

| ID OF IC CARD | NETWORK ADDRESS OF HOST COMPUTER |
|---|---|
| 162696509400678657 | 192.168.0.2 |
| 149467185495277825 | 192.168.0.3 |
| . . . . | . . . . |

| NETWORK ADDRESS OF AUTHENTICATION UNIT | NETWORK ADDRESS OF PRINTER |
|---|---|
| 192.168.0.16 | 192.168.0.48 |
| 192.168.0.17 | 192.168.0.49 |
| . . . . | . . . . |

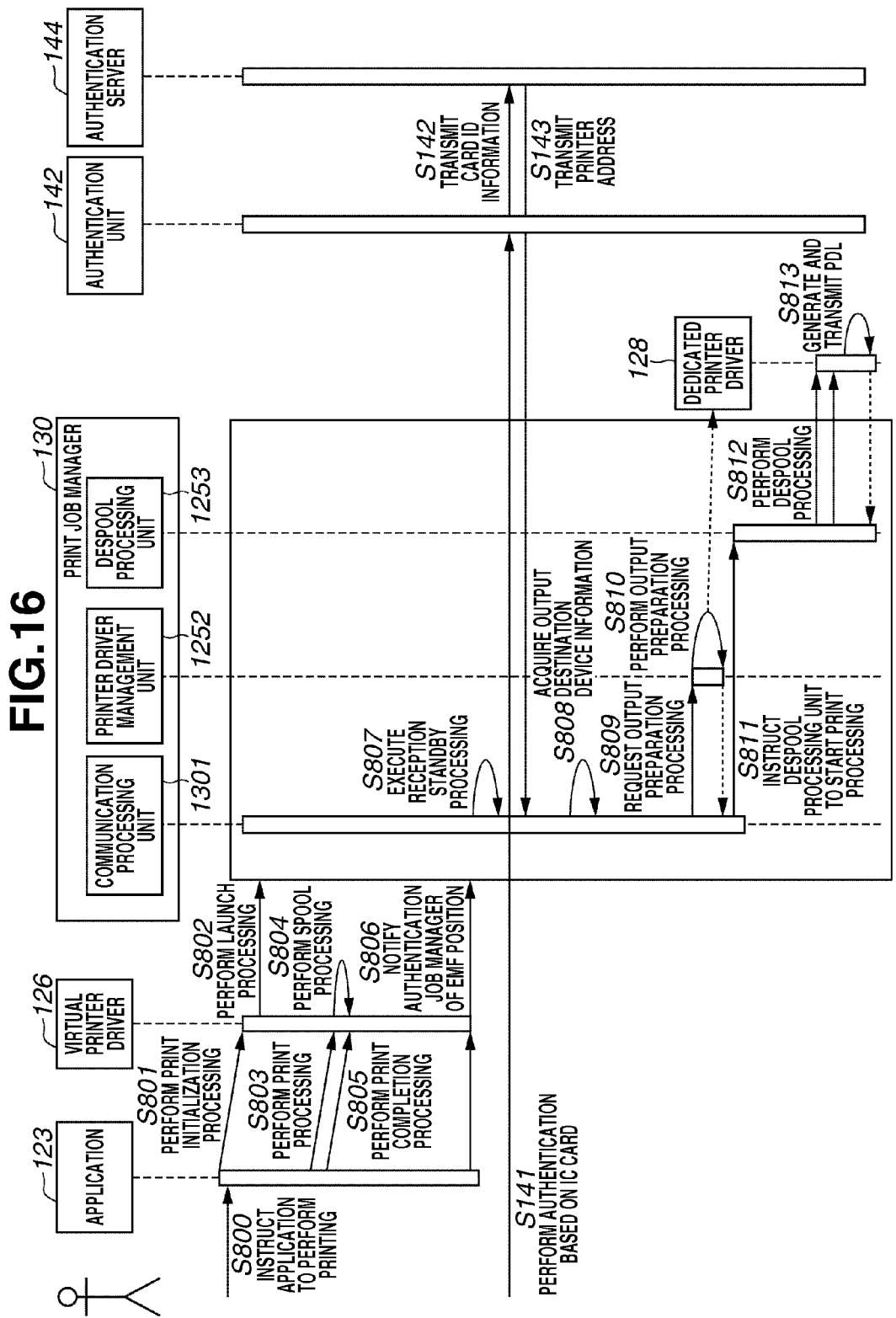

INFORMATION PROCESSING APPARATUS, INFORMATION PROCESSING METHOD, AND PROGRAM

BACKGROUND OF THE INVENTION

1. Field of the Invention

The present invention relates to a technique capable of controlling installation of a device driver to use a peripheral device, such as a printer.

2. Description of the Related Art

In general, to use a peripheral device (e.g., a printer or a scanner) via an information processing apparatus (e.g., a personal computer), the information processing apparatus is required to incorporate a specific device driver applicable to the peripheral device. For example, in a case where a user uses a plurality of peripheral devices, the user installs the same number of printer drivers on the user's information processing apparatus. In this case, the user is forced to perform a troublesome installation work, which includes checking of an Internet Protocol (IP) address of each peripheral device and searching for an applicable device driver.

To solve the above-described problem, there is a conventional technique capable of efficiently performing the installation work. For example, a conventional system discussed in Japanese Patent Application Laid-Open No. 2005-135414 receives configuration information from a peripheral device that is accessible via a network and installs an applicable device driver on an information processing apparatus.

According to the conventional technique discussed in Japanese Patent Application Laid-Open No. 2005-135414, it is required to install the device driver beforehand when a user requests a print operation. However, for example, at the print request time when the printing is requested via a general application, a printer accessible via the network may not be present, for example, if the information processing apparatus is relocated to another setup position. Further, at the print request time, a new printer that the user wants to use may be accessible via the network. Accordingly, it is strongly desired to provide an appropriate method for installing a desired printer driver timely at the print request time, namely, when the printing is requested via the general application.

SUMMARY OF THE INVENTION

Exemplary embodiments of the present invention are directed to a technique capable of appropriately installing a desired device driver at the time when a user requests a peripheral device to perform designated processing.

According to an aspect of the present invention, an information processing apparatus includes an operating system (OS) executable thereon in such a way that a component operable based on administrator's authority can realize installation of a device driver. The information processing apparatus includes a selection unit configured to select a peripheral device that serves as an output destination of a processing request if the processing request is received from a user via an application, and a management unit configured to control setting processing for a device driver applicable to the selected peripheral device to use the peripheral device. The management unit is configured to request a first component operable on the OS based on administrator's authority to perform setting processing for a device driver applicable to the selected peripheral device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1B is a block diagram illustrating an internal configuration of a host computer and a printer according to the first exemplary embodiment of the present invention.

FIG. 7 is a sequence diagram illustrating the print processing according to the first exemplary embodiment of the present invention.

FIGS. 8A, 8B, 8C, and 8D illustrate examples of user interfaces for an application and a print job manager.

FIGS. 13A and 13B illustrate examples of data that can be processed by BiDi API.

FIGS. 15A and 15B illustrate examples of combined information that can be stored by the authentication unit.

FIG. 16 is a sequence diagram illustrating print processing according to the second exemplary embodiment of the present invention.

DESCRIPTION OF THE EMBODIMENTS

Various exemplary embodiments, features, and aspects of the invention will be described in detail below with reference to the drawings.

Figure 1A:
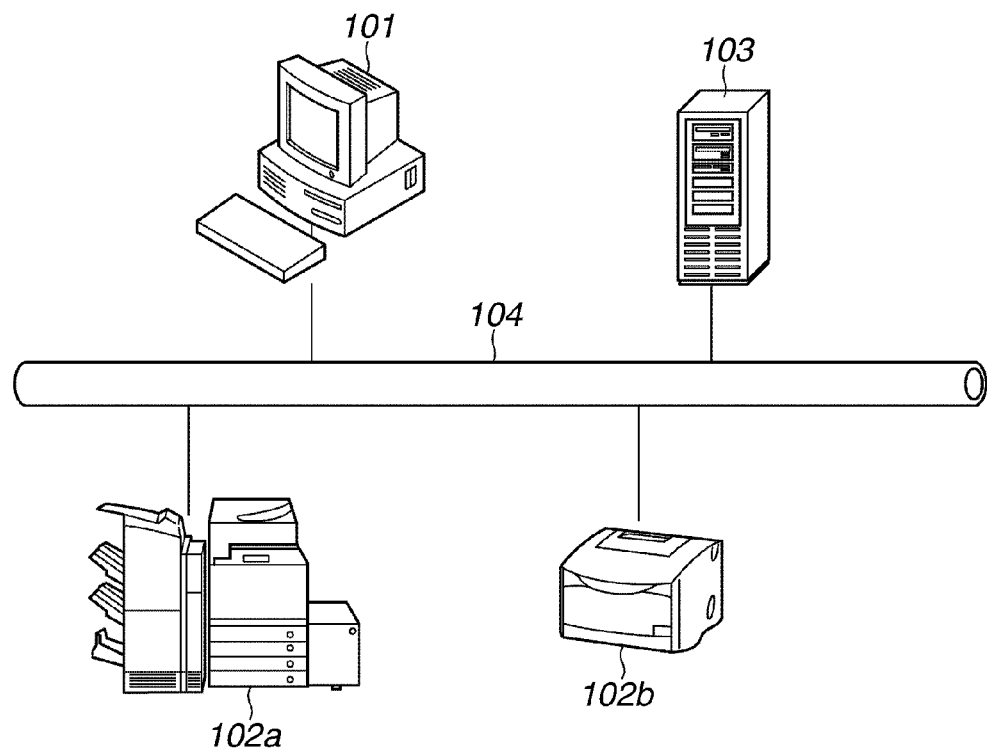
FIG. 1A illustrates a network system according to a first exemplary embodiment of the present invention.

An example system according to a first exemplary embodiment is described below. FIG. 1A is a block diagram schematically illustrating a network system according to an exemplary embodiment of the present invention. The network system illustrated in FIG. 1A includes a host computer 101, a plurality of printers (102a, 102b, . . . ) each serving as a peripheral device capable of performing printing based on print data received from the host computer 101, and a distribution server 103 that can distribute a device driver, which are connected to each other via a network 104.

FIG. 1B is a block diagram illustrating an example apparatus configuration of the host computer 101 or the printer 102 illustrated in FIG. 1A.

The host computer 101 is an information processing apparatus, such as a general personal computer. A central processing unit (CPU) 111 can execute a program loaded into a random access memory (RAM) 112 to control various operations to be performed by each device connected to a system bus 114. The RAM 112 is functionally operable as a main memory or a work area for the CPU 111. A read only memory (ROM) 113 stores various program and data. More specifically, the ROM 113 includes a font ROM 113a that stores various font data, a program ROM 113b that stores a boot program and a basic input/output system (BIOS), and a data ROM 113c that stores various data.

A keyboard controller interface (I/F) 115 can control key instructions input via a keyboard 119 and a pointing device (not illustrated), such as a mouse. A display I/F 116 can control a display device 120 to perform a display on a screen thereof. An external memory I/F 117 can control each access to an external memory 121, such as a hard disk (HD) or a Solid State Disk (SSD).

The external memory 121 is functionally operable as a computer readable storage medium, which can store an operating system (hereinafter, referred to as "OS") program 122, various applications 123, and a print processing related program 124. Further, the external memory 121 stores user files and editing files, although not illustrated in the drawing. In the present exemplary embodiment, the OS 122 is Microsoft Windows®.

The print processing related program 124 includes a print job manager 125, a virtual printer driver 126, a universal printer driver 127, a specific printer driver 128, and an installer 129, which can perform various operations according to the present exemplary embodiment.

Further, the print processing related program 124 includes an authentication job manager 130, which can perform various operations according to a second exemplary embodiment.

The virtual printer driver 126 is a program usable when a document is indirectly, not directly, printed by a physical printer according to the present exemplary embodiment. The technical terminology "virtual" indicates "indirectness" in the present exemplary embodiment. The virtual printer driver 126 can be regarded as an ordinary printer driver when it is registered to the OS 122. Therefore, users can perform a virtual printing work according to a procedure similar to that of an ordinary printing work.

On the other hand, the universal printer driver and the specific printer driver are classified into the same group that can be generally used to instruct a print operation. More specifically, the universal printer driver enables to perform printing using a plurality of printers of different device models. The universal printer driver can use common functions provided for the corresponding device models. On the other hand, the specific printer driver is applicable to a single device model. The specific printer driver is designed to optimize the functions of the corresponding device model.

A network I/F 118 is connected to a printer 102 via the network 104. The network I/F 118 is capable of controlling communications performed between the host computer 101 and the printer 102. The distribution server 103 is similar to the host computer 101 in apparatus configuration.

Next, an example configuration of the printer 102 is described below. A CPU 132 can control various operations to be performed by the printer 102. A RAM 139 is functionally operable as a main memory or a work area for the CPU 132. The RAM 139 can be used as an output information rasterizing area or an environmental data storage area. Further, the RAM 139 includes a non-volatile RAM (NVRAM) area so that the memory capacity can be expanded when an optional RAM is connected to an expansion port (not illustrated).

A ROM 133 includes a font ROM 133a that stores various fonts, a program ROM 133b that stores control programs that can be executed by the CPU 132, and a data ROM 133c that stores various data. A network I/F 138 can transmit and receive data to and from the host computer 101. A printing unit I/F 136 is operable as an interface that controls a printing unit 137 (i.e., a printer engine). An external memory I/F 140 can control each access to an external memory 134. The external memory 134 can include, as an optional storage, an HD and an SSD. The external memory 134 stores font data, an emulation program, and form-data.

Further, the external memory 134 can store a specific printer driver 143 according to the present exemplary embodiment. When the external memory 134 (e.g., the hard disk) is not connected to the printer 102, the data ROM 133c of the ROM 133 stores data and information to be used by the host computer 101. Although only one external memory 134 is illustrated in FIG. 1B, a plurality of external memories can be connected to the external memory I/F 140.

For example, it is useful to connect a plurality of external memories to the printer 102 so that an option font card is available in addition to built-in font data or a language program is available to interpret printer control languages of a different language system.

An operation unit 142 includes an operation panel to enable users to input operational instructions using a plurality of switches and LED display devices (not illustrated) disposed on the operation panel. Further, the operation unit 142 may include an NVRAM (not illustrated) that can store printer mode setting information if it is input via the operation panel. The CPU 132 can output an image signal, as output information, to the printing unit 137 via the printing unit I/F 136 based on a control program or the like stored in the program ROM 133b of the ROM 133. Further, the CPU 132 can communicate with the host computer 101 via the network I/F 138. The CPU 132 can receive print data from the host computer 101 and can transmit information relating to the printer 102 to the host computer 101.

Figure 2:
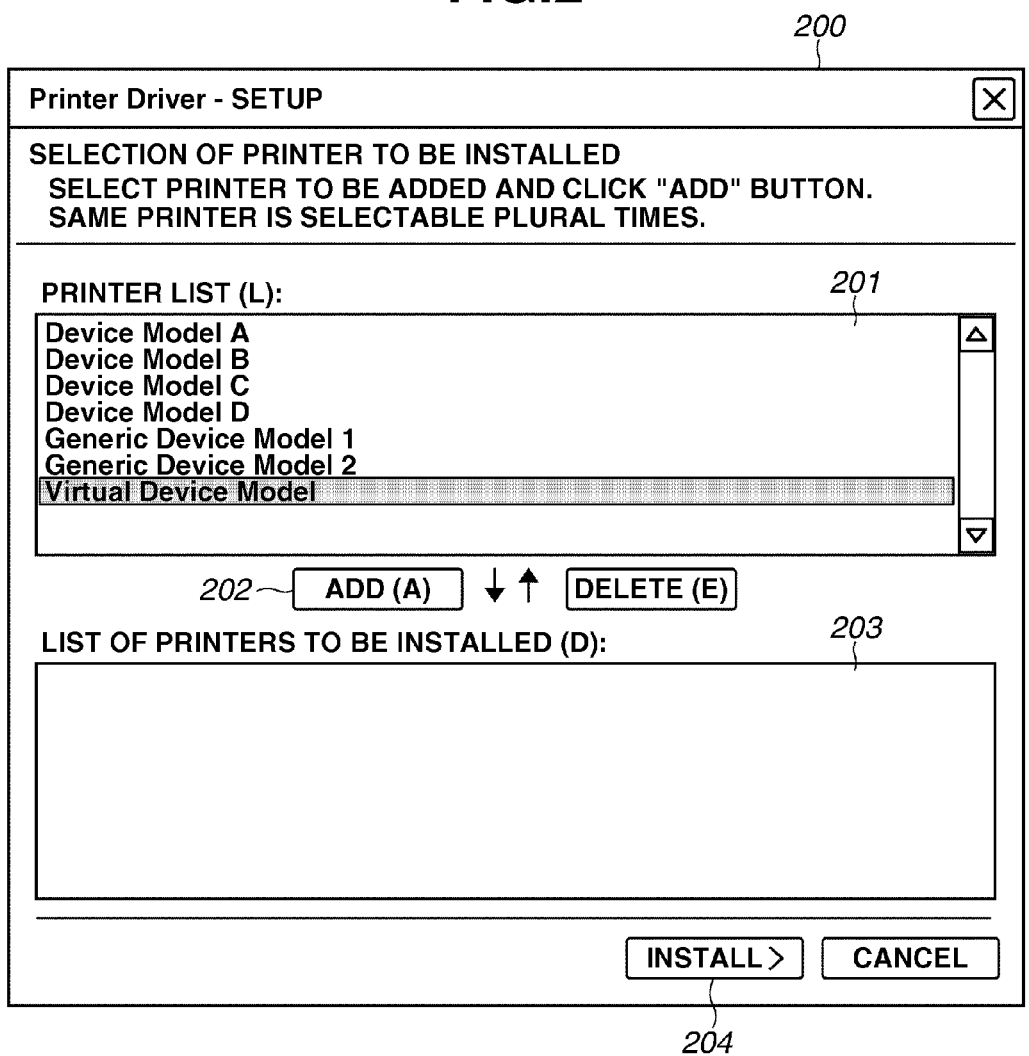
FIG. 2 illustrates an example user interface of an installer.

The installer 129 illustrated in FIG. 1B includes a user interface (UI) 200 illustrated in FIG. 2. When the host computer 101 executes the installer 129, a printer list 201 including a list of installable printer drivers can be displayed on the display device 120.

"Device Model A" represents a specific printer driver that is applicable to a device model A type printer. "Device Model B" represents a specific printer driver that is applicable to a device model B type printer. "Device Model C" represents a specific printer driver that is applicable to a device model C type printer. "Device Model D" represents a specific printer driver that is applicable to a device model D type printer.

"Generic Device Model 1" represents a universal printer driver that is applicable to both the device model A type printer and the device model B type printer. "Generic Device Model 2" represents a universal printer driver that is applicable to both the device model C type printer and the device model D type printer.

"Virtual Device Model" represents a virtual printer driver that can be applied to any type of printer. If a user selects an arbitrary model and presses an addition button 202, the selected model can be added as an installation target to a printer list 203. Subsequently, if the user presses an installation button 204, the installer 129 installs a printer driver of the designated model.

Figure 3:
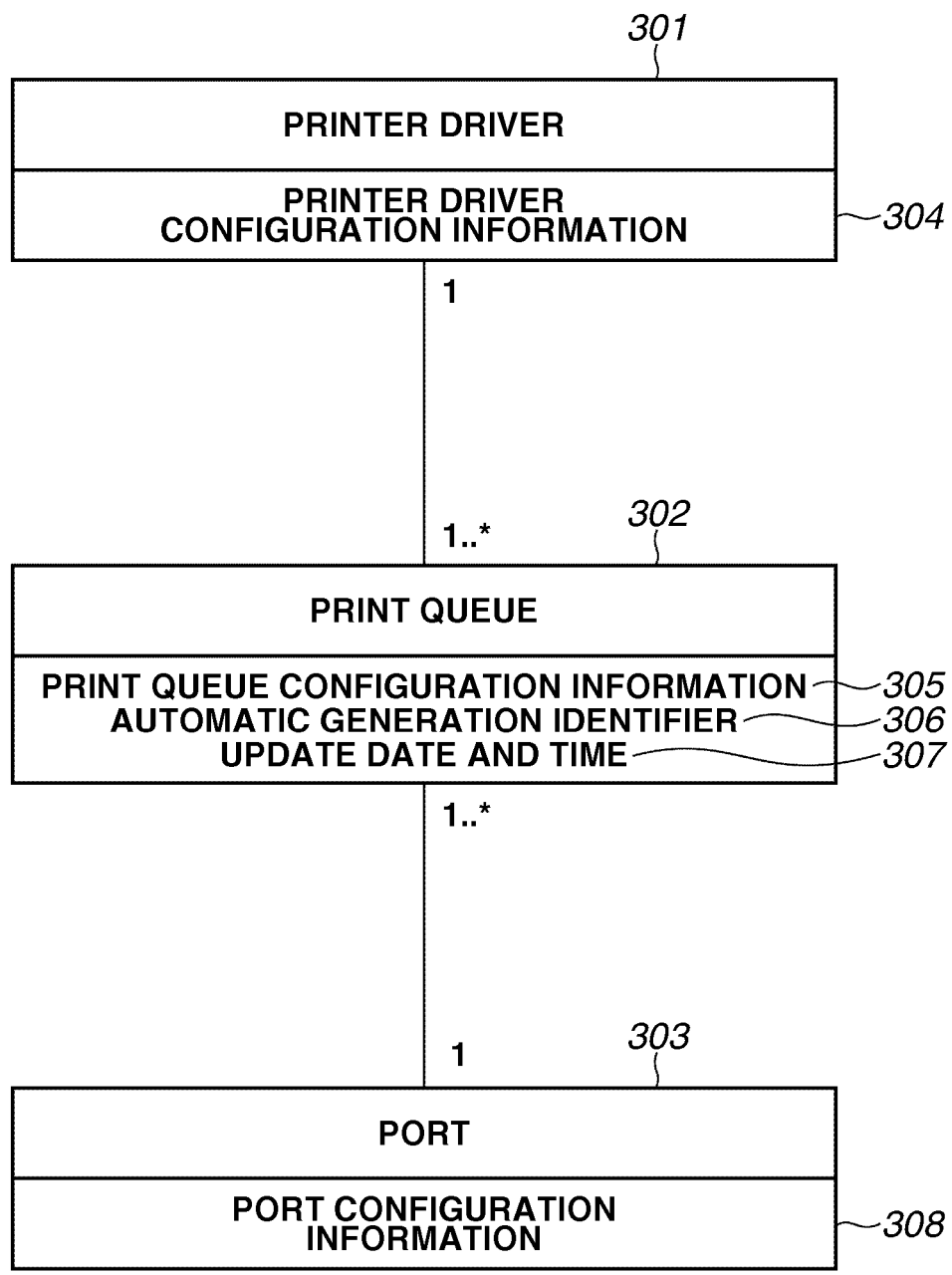
FIG. 3 illustrates a relationship between a printer driver, a print queue, and a port.

FIG. 3 illustrates a relationship between a printer driver, a print queue, and a port, which is an object diagram of Unified Modeling Language (UML).

A print queue 302 serves as a print target object when the printing is performed via the application. A plurality of print queues can be generated by a printer driver 301 of the same device model. For example, in a case where three printers that belong to the "Device Model A" are present in the same office, only one printer driver applicable to the "Device Model A" is installed and three print queues are generated using the printer driver.

A port 303 is an object that identifies an output destination of the network. In general, the relationship between the print queue and the port is in a one-to-one relationship. As illustrated in the drawing, the same port can be used for a plurality of print queues.

Further, the printer driver 301 includes printer driver configuration information 304. The printer driver configuration information 304 is composed of driver version, device model name, hardware information, and driver module name. The printer driver configuration information 304 can be managed by the OS 122. The print queue 302 includes print queue configuration information 305. The print queue configuration information 305 is composed of print queue name, port name, print setting information, job input time, and job status. The print queue configuration information 305 can be managed by the OS 122.

Further, the print queue 302 includes automatic generation identifier 306 and update date and time 307, which are peculiar to the present exemplary embodiment and can be managed by the print job manager 125. The port 303 includes port configuration information 308. The port configuration information 308 is composed of port name, module name, and IP address. The port configuration information 308 can be managed by the OS 122.

Figure 4:
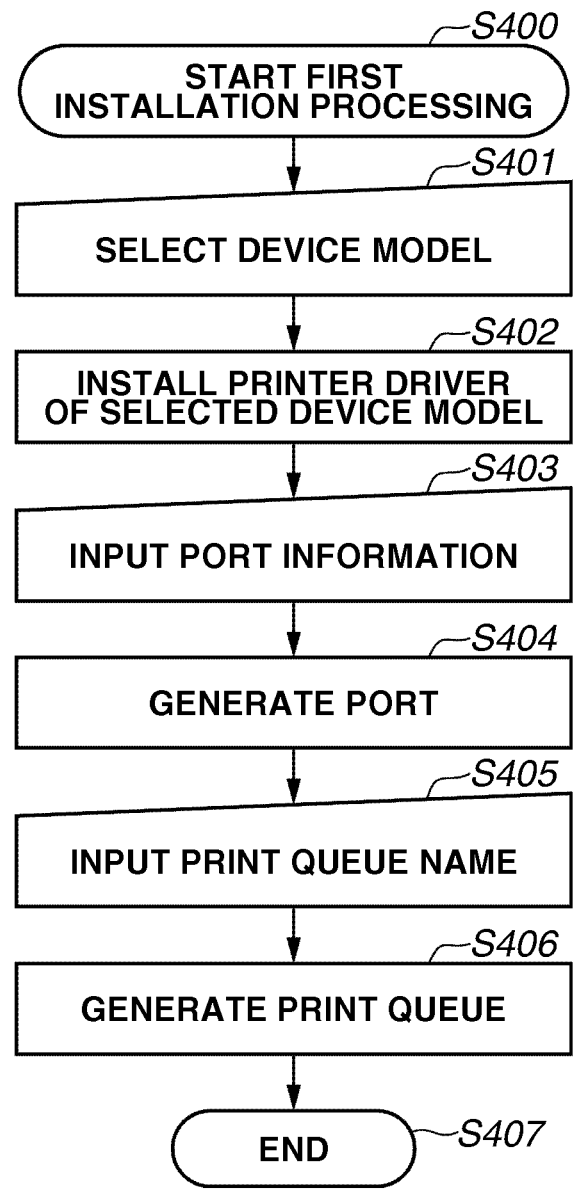
FIG. 4 is a flowchart illustrating first installation processing (i.e., ordinary printer driver installation processing) according to the first exemplary embodiment of the present invention.

FIG. 4 is a flowchart illustrating ordinary printer driver installation processing that can be performed by the installer 129 illustrated in FIG. 1B. The ordinary printer driver is a specific printer driver or a universal printer driver. In the present exemplary embodiment, the processing illustrated in FIG. 4 is referred to as "first installation processing."

If in step S400 the installer 129 starts the printer driver installation processing, then in step S401, the installer 129 accepts a device model having been selected by a user. In the present exemplary embodiment, it is assumed that the device model selected by the user is other than the "Virtual Device Model" in the printer list 201 illustrated in FIG. 2. If the installer 129 accepts a specific printer driver or a universal printer driver having been selected, then in step S402, the installer 129 installs a printer driver of the selected device model.

Next, in step S403, the installer 129 accepts port information (e.g., IP address) having been input by the user. Then, in step S404, the installer 129 generates a port. Next, in step S405, the installer 129 accepts a print queue name having been input by the user. Then, in step S406, the installer 129 generates a print queue while associating the printer driver installed in step S402 with the port generated in step S404. In step S407, the installer 129 terminates the ordinary (i.e., dedicated or general) printer driver installation processing illustrated in FIG. 4.

Figure 5:
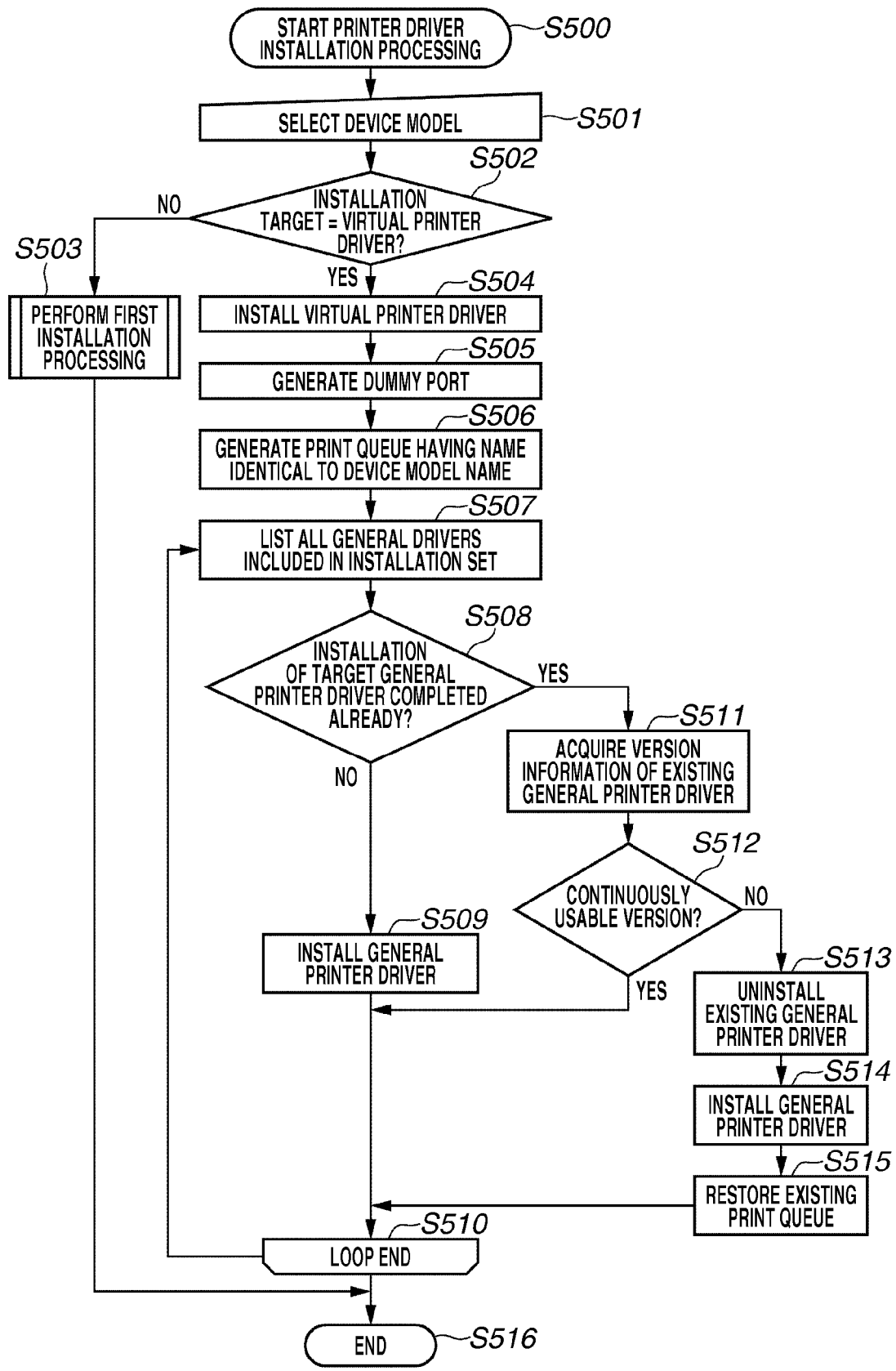
FIG. 5 is a flowchart illustrating virtual, general, and specific printer driver installation processing according to the first exemplary embodiment of the present invention.

FIG. 5 is a flowchart illustrating processing for installing a printer driver selected by a user from a plurality of printer drivers, including the virtual printer driver (i.e., the processing peculiar to the present exemplary embodiment), which can be performed by the installer 129 illustrated in FIG. 1B.

If in step S500 the installer 129 starts printer driver installation processing, then in step S501, the installer 129 accepts a device model having been selected by a user.

Then, in step S502, the installer 129 determines whether the selected device model is the virtual printer driver. If it is determined that the selected device model is not the virtual printer driver (NO in step S502), then in step S503, the installer 129 performs the ordinary (i.e., dedicated or general) printer driver installation processing illustrated in FIG. 4. Processing to be performed in step S503 is similar to the processing performed in steps S402 to S407 illustrated in FIG. 4. Then, in step S516, the installer 129 terminates the installation processing illustrated in FIG. 5.

If it is determined that the selected device model is the virtual printer driver (YES in step S502), then in step S504, the installer 129 installs the virtual printer driver. The virtual printer driver according to the present exemplary embodiment does not directly output any print data to a port. Therefore, in step S505, the installer 129 generates a dummy port without requiring any input from the user. It is unnecessary to generate a plurality of print queues for the virtual printer driver. Therefore, in step S506, the installer 129 generates a print queue having a name identical to the device model name without requiring any input from the user.

According to the above-described ordinary printer driver installation processing illustrated in FIG. 4, three steps S401, S403, and S405 involve input operations to be performed by the user. On the other hand, in the virtual printer driver installation processing that is peculiar to the present exemplary embodiment, only one step S501 involves an input operation (selection) to be performed by the user. If the installer 129 is an installer program that targets only the virtual printer driver, the user is not required to input any selection result in step S501. In other words, the virtual printer driver installation processing is effective in reducing the burden of an operator and operational costs.

The virtual printer driver according to the present exemplary embodiment does not output any print data to a port. Hence, the system according to the present exemplary embodiment can perform universal printer driver installation processing to enable users to use at least fundamental functions (e.g., number-of-copies designation function) in response to an instruction of the virtual printer driver installation. In step S507 to step S510, the installer 129 performs universal printer driver installation processing accompanying the installation of the virtual printer driver.

The printer list 201 illustrated in FIG. 2 includes "Generic Device Model 1" and "Generic Device Model 2" as universal printer drivers. Therefore, the installer 129 designates the "Generic Device Model 1" as an installation target in the first loop processing and designates the "Generic Device Model 2" as an installation target in the second loop processing.

In step S508, the installer 129 determines whether the target universal printer driver is already installed on the host computer 101. If it is determined that the target universal printer driver is not yet installed (NO in step S508), then in step S509, the installer 129 installs the universal printer driver. In the present exemplary embodiment, the installer 129 does not generate any print queue using the universal printer driver. Therefore, the user does not mind the installation of the universal printer driver. Then, the processing proceeds to step S510. If the loop processing is completed, then in step S516, the installer 129 terminates the installation processing illustrated in FIG. 5.

If it is determined that the target universal printer driver is already installed on the host computer 101 (YES in step S508), then in step S511, the installer 129 acquires version information of the already installed universal printer driver. In step S512, the installer 129 determines whether the already installed universal printer driver is continuously usable with reference to the acquired version information. If it is determined that the already installed universal printer driver is continuously usable (YES in step S512), the processing proceeds to step S510.

If it is determined that the already installed universal printer driver is not continuously usable (NO in step S512), then in step S513, the installer 129 uninstalls the already installed universal printer driver. Further, in step S514, the installer 129 installs an extracted universal printer driver. Further, in step S515, the installer 129 restores the print queue having been previously generated using the already installed universal printer driver (i.e., the universal printer driver uninstalled in step S513). In this case, to restore the previous print queue, the installer 129 uses the universal printer driver installed in step S514.

As described above, the installer 129 installs the virtual printer driver and generates its print queue. Further, the installer 129 automatically installs the universal printer driver. In the exemplary embodiment, the installer 129 illustrated in FIG. 1B performs the universal printer driver installation processing (i.e., the processing to be performed in step S507 and subsequent steps). However, the above-described processing can be executed in the initialization processing of the virtual printer driver 126. Further, a setup module of a printer driver (not illustrated), which is generally referred to as "VendorSetup" and can be called by the OS 122, is usable to execute the above-described processing.

Figure 6:
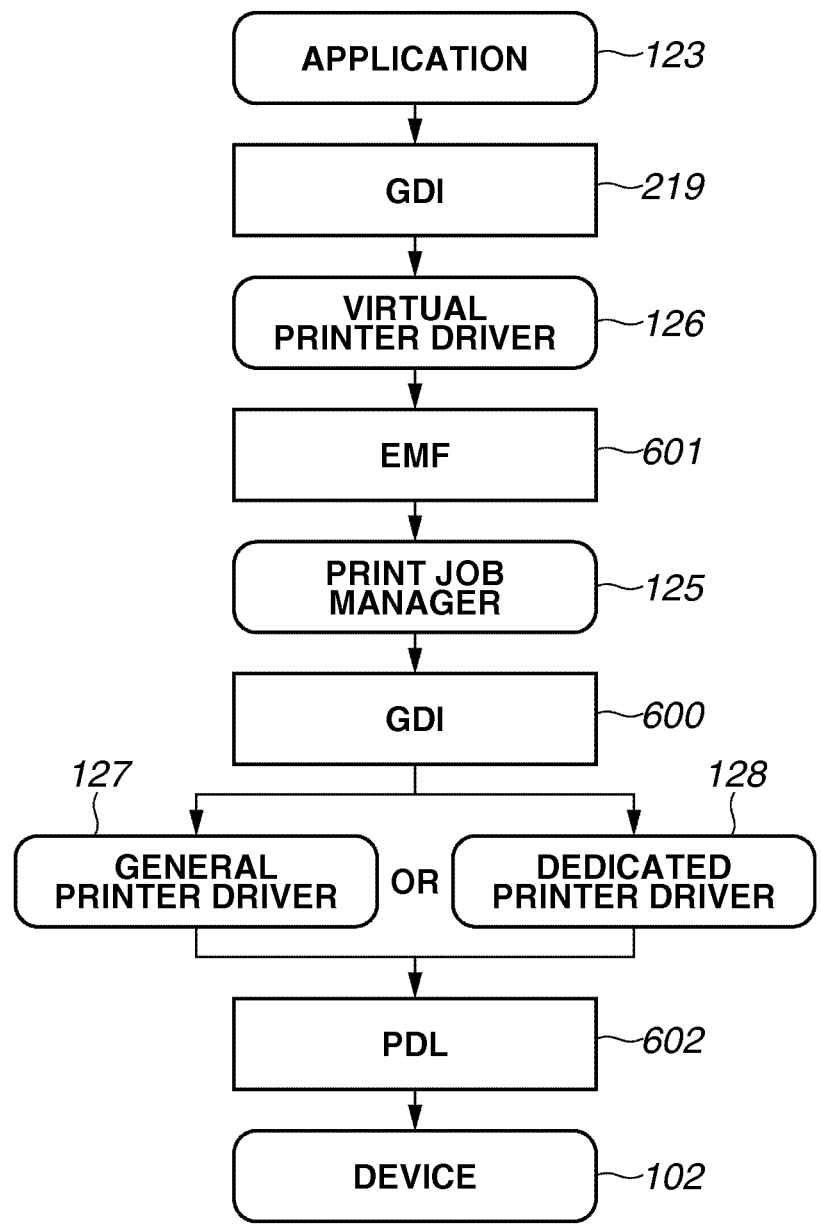
FIG. 6 is a data flow diagram illustrating print processing according to the first exemplary embodiment of the present invention.

FIG. 6 is a data flow diagram illustrating example print processing, which indicates data input/output between respective components of the print processing related program.

The application 123 outputs a print instruction command to the virtual printer driver 126 via a Graphic Device Interface (GDI) 219. The OS 122 provides the GDI 219 as a drawing interface. Next, the virtual printer driver 126 converts the input print instruction command into an Enhanced Meta File (EMF) 601. The virtual printer driver 126 outputs the EMF 601 to the print job manager 125. The EMF 601 is an intermediate data format compatible with the print instruction command of the GDI 219. The EMF 601 stores, as reproducible data, the sequential print instruction command output from the application 123.

The system according to the present exemplary embodiment uses the EMF 601 as an example intermediate data format. However, any other data having an arbitrary format capable of reproducing print instruction commands, such as eXtensible Markup Language (XML) Paper Specification (XPS), Portable Document Format (PDF), or a uniquely defined format, is usable.

The print job manager 125 performs unique processing, which includes identification of the printer and management of the general/specific printer driver. Then, the print job manager 125 outputs the print instruction command via a GDI 600. The output print instruction command is received by the universal printer driver 127 or the specific printer driver 128.

Next, the universal printer driver 127 or the specific printer driver 128 converts the input print instruction command into a Printer Description Language (PDL) 602 that can be processed by the printer 102. Then, the PDL 602 is output to the printer 102. Finally, the printer 102 processes the input PDL 602 and outputs a printed product.

FIG. 7 illustrates an example sequence of the print processing according to the present exemplary embodiment, which indicates various processing to be performed in or between respective components of the print processing related program during the sequential print processing.

Figure 8A:
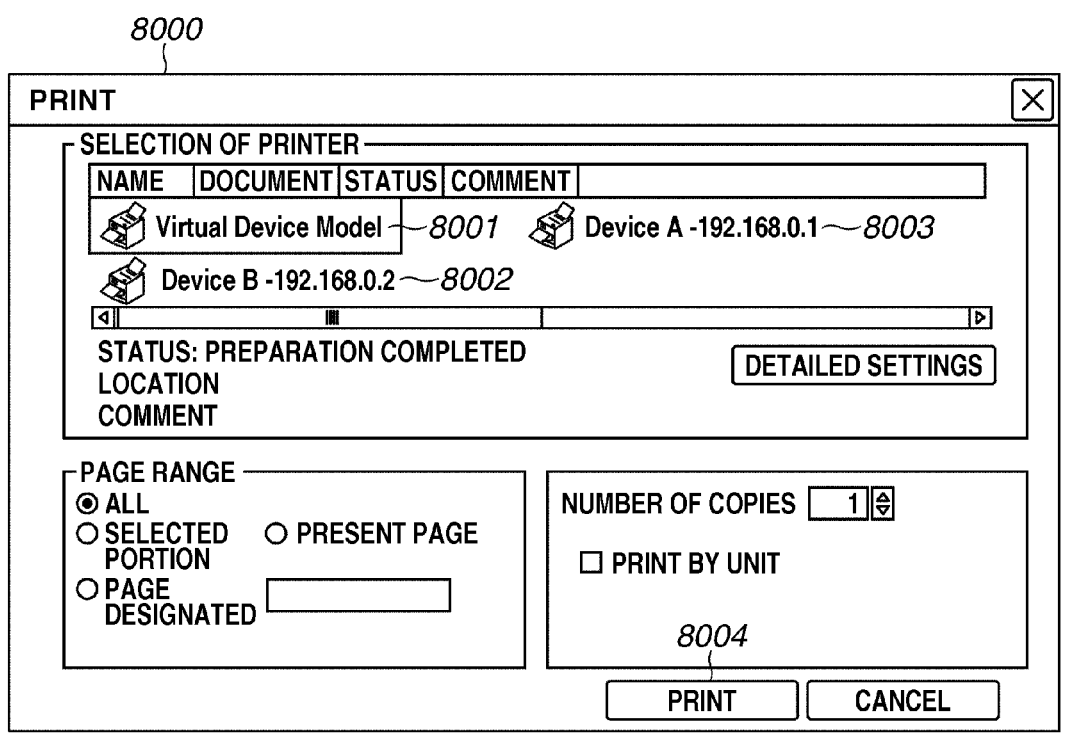

First, in step S700, a user inputs a print instruction to the application 123 via a user interface (UI) 8000 illustrated in FIG. 8A to instruct a document to be printed. The UI 8000 illustrated in FIG. 8A includes icons 8001 to 8003 each representing a print queue. More specifically, the icon 8001 represents a print queue of the virtual printer driver. The icon 8002 represents a print queue of a specific printer driver. The icon 8003 represents a print queue of another specific printer driver. In the present exemplary embodiment, a user selects the icon 8001 to output a printed product using the virtual printer driver and presses a print button 8004 to instruct a print operation.

Next, in step S701, the application 123 initializes the virtual printer driver 126. If the print initialization is completed, then in step S702, the virtual printer driver 126 launches the print job manager 125.

The print job manager 125 is a program to be launched after the virtual printer driver 126 has started the document print operation. The print job manager 125 performs unique processing, which includes identification of the printer and management of the general/specific printer driver. Further, the print job manager 125 includes a device identification unit 1251, a driver management unit 1252, and a despool processing unit 1253, as internal components thereof.

If the print job manager 125 is launched, then in step S703, the application 123 causes the virtual printer driver 126 to start print processing. The application 123 outputs sequential print drawing commands via the GDI 219. In step S704, the virtual printer driver 126 converts the input sequential print drawing commands into the EMF 601 and stores the EMF 601 in the external memory 121 so that the print drawing commands can be reproduced in the following processing stage. The processing performed by the virtual printer driver 126 in step S704 is referred to as spool processing.

In step S705, the application 123 performs print completion processing after completing the processing of the sequential print drawing commands. In step S706, the virtual printer driver 126 notifies the print job manager 125 of information indicating the storage position of the EMF 601 in the external memory 121. Although in step S704 the virtual printer driver 126 performs the spool processing on the external memory 121, it may be useful to directly perform spool processing on the print job manager 125 without using the external memory 121.

Next, in step S707, the device identification unit 1251 searches a printer. In the present exemplary embodiment, the technical terminology "search" means communicating with the printer 102a or 102b via the network 104 to acquire printer information (e.g., name, setup location, IP address, and hardware information). The hardware information includes printer model information and vendor (manufacturer) information. The conventionally known communication protocol, such as Simple Network Management Protocol (SNMP) or Web Services on Devices (WSD) is usable appropriately.

It is generally impossible to check the state of the printer 102a or 102b (i.e., power on/off state or connection/disconnection to the network 104) beforehand. Therefore, the device identification unit 1251 tries to communicate with all printers in response to each print instruction. An appropriate technique, such as broadcasting, is usable in communications with respective apparatuses existing in the network.

If the device identification unit 1251 transmits SNMP information acquisition data, via the network I/F 118, according to the broadcasting method, every printer 102 accessible via the network 104 receives the information acquisition data. Then, if each printer 102 transmits information (e.g., name or setup location) relating to the acquisition target printer, as response data, via the network I/F 138, the device identification unit 1251 successively receives these responses and stores the received information in the RAM 112.

Figure 8B:
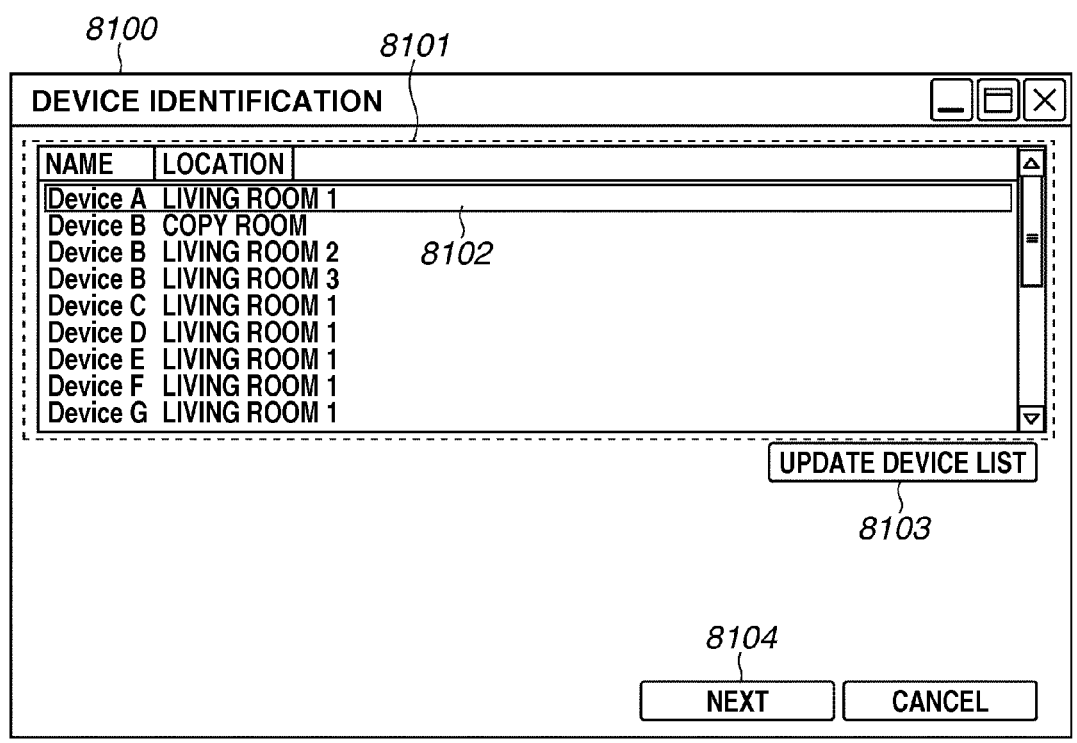

In step S708, the device identification unit 1251 extracts device information (e.g., device name and setup location) from the received response and displays, as a printer list, a UI 8100 illustrated in FIG. 8B. The UI 8100 includes a list control 8101 that displays information to enable a user to select a desired printer with a cursor 8102.

If the user presses a button 8103, re-search processing is performed in the network to update the list indicating usable printers. In step S709, the user can press a button 8104 to identify the device presently selected with the cursor 8102 as an output destination. In response to the determination of the output destination (see step S709), the device identification unit 1251 starts the following processing.

Further, the user can operate a check box 8105 and a button 8106 to manage print queues. An example method for operating these elements is described below. If in step S709 the output destination device is determined, then in step S710, the device identification unit 1251 requests the driver management unit 1252 to execute output preparation processing.

As a result of the output preparation processing (in step S711), a print queue of a specific printer driver 128 (or a universal printer driver (not illustrated)) applicable to the selected printer 102 is registered in the OS 122. The output preparation processing (i.e., the processing to be performed in step S711) is described in detail below with reference to FIGS. 9 and 10.

Next, in step S712, the device identification unit 1251 closes the device identification screen illustrated in FIG. 8B and causes the despool processing unit 1253 to display a screen 8200 illustrated in FIG. 8C. In step S713, the despool processing unit 1253 displays an image to be obtained when a document is actually printed in a preview area 8201. The image to be displayed in this case can be drawn according to the size of the preview area 8201 when the despool processing unit 1253 reads and analyzes the EMF 601 spooled in step S704.

A spin control 8202 and a check box 8203 are input devices relating to general print settings. More specifically, a spin control 8202 is an input device that enables users to change the number of copies. The check box 8203 is an input device that enables users to set a monochrome print. Further, a button 8204 can be pressed to display a printer driver unique UI (not illustrated) to change uncommon print settings.

In this case, if the print queue that corresponds to the output destination is that of the specific printer driver 128, it is feasible to perform print settings including a function peculiar to the output destination printer (e.g., bookbinding function), compared to that of the universal printer driver 127. A "Back" button 8206 can be pressed to close the screen 8200 and reopen the device identification screen 8100 (i.e., the previously displayed screen).

If in step S714 the user presses a button 8205, then in step S715, the despool processing unit 1253 performs despool processing on the specific printer driver 128 and issues sequential print drawing commands. The despool processing is opposed to the spool processing. More specifically, the despool processing unit 1253 reads and analyzes the EMF 601 data from the storage position information notified in step S706 and reproduces the print drawing commands.

Thus, the system can resume the print processing having been interrupted due to the processing of the print job manager 125 and can output a printed document. In step S716, the specific printer driver 128 converts each input print drawing command into the PDL 602 and transmits the PDL 602 to the printer 102 via the network I/F 138. Finally, the print job manager 125 terminates the program.

FIGS. 8A to 8C illustrate an example transition of the user interface (UI) that can be displayed by the print job manager 125.

First, the print job manager 125 displays the UI 8100 that includes a device identification dialog. If a user identifies a printer and presses the "Next" button 8104, the print job manager 125 displays the UI 8200 that includes an "editing preview" dialog. The UI 8200 enables the user to confirm a preview of a print job and perform fundamental print settings.

If the "Print" button 8205 is pressed, the print job manager 125 instructs the printer to perform printing and closes the dialog. The UI 8200 further includes the "Detailed settings" button 8204 that enables the user to set a function peculiar to the printer driver. If the "Detailed settings" button 8204 is pressed, the print job manager 125 displays a "print setting" dialog of the printer driver. The UI 8200 further includes the "Back" button 8206. If the desired function cannot be realized by the present output destination device, the user can press the "Back" button 8206 to perform the printer settings again. If the "Back" button 8206 is pressed, the print job manager 125 displays the UI 8100 so that the user can designate another printer.

Figure 9:
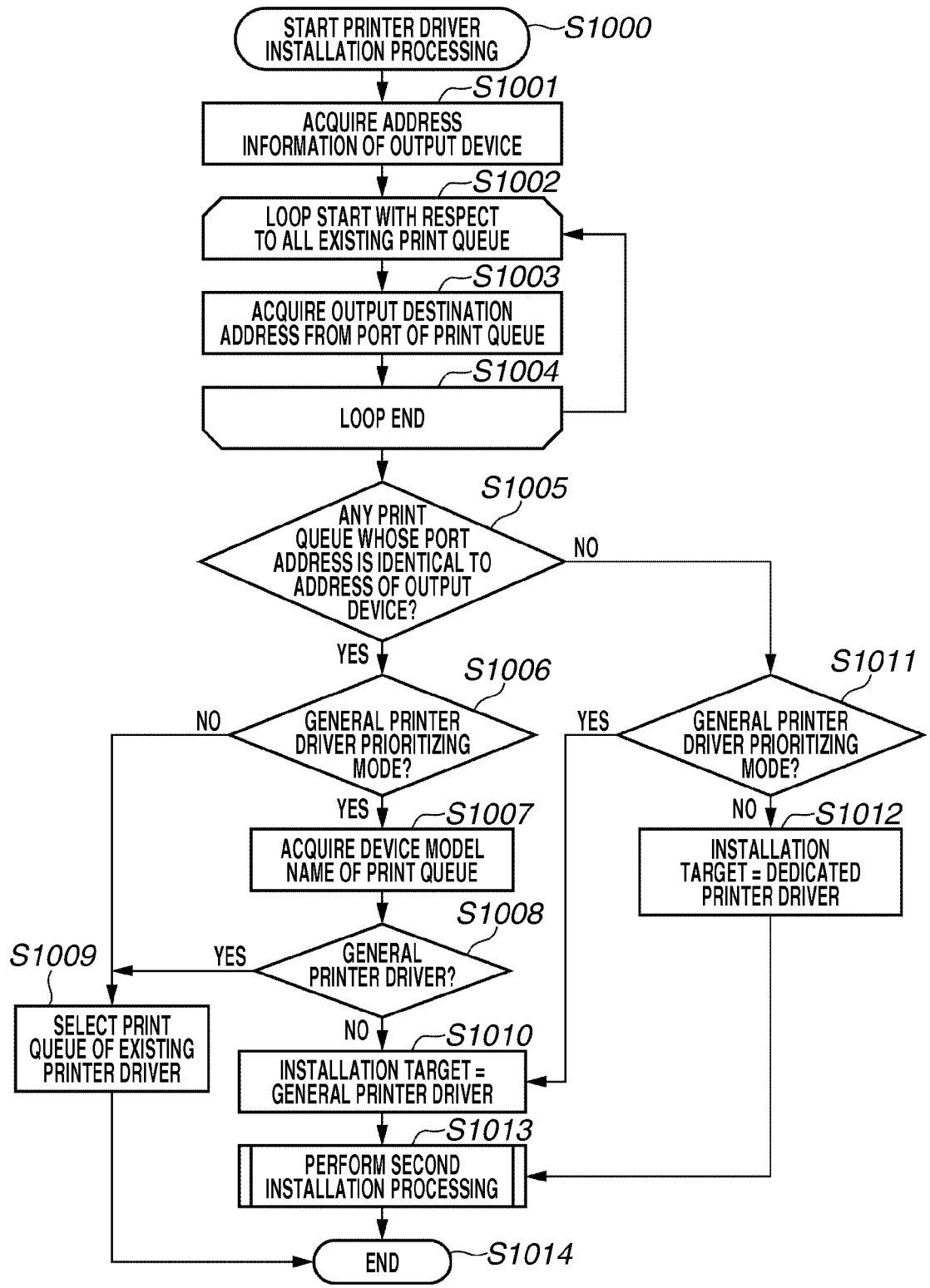
FIG. 9 is a flowchart illustrating output preparation processing according to the first exemplary embodiment of the present invention.

FIG. 9 is a flowchart illustrating details of the output preparation processing that can be performed by the driver management unit 1252 (see step S711). In the present processing, if a print queue that requests the printer selected by the user in step S709 to perform printing is already present, the driver management unit 1252 selects the already existing print queue. If there is not any existing print queue, the driver management unit 1252 generates a new print queue or installs an optimum printer driver in the information processing apparatus.

If in step S1000 the output preparation processing is started, then in step S1001, the driver management unit 1252 acquires address information (e.g., IP address) of the printer 102. The address information acquired in this case is the information having been acquired in the printer search processing (see step S707) and extracted from the RAM 112. Subsequently, in step S1002 to step S1004, the driver management unit 1252 acquires address information of a port associated with each print queue registered by the OS 122.

Next, in step S1005, the driver management unit 1252 determines whether there is any print queue whose port address information coincides with the address information of the printer selected by the user in step S709. As described below, the system according to the present exemplary embodiment generates the print queue for each printer. However, if another print queue is generated each time a printer performs printing, a great amount of duplicate print queues will be registered.

To avoid the above-described situation, the driver management unit 1252 compares address information between the printer and all print queues to identify the presence of an existing print queue that can be output. If there is a print queue that can be output (YES in step S1005), the processing proceeds to step S1006. If there is not any print queue that can be output (NO in step S1005), the processing proceeds to step S1011.

Next, in step S1006, the driver management unit 1252 determines whether the printer driver to be prioritized is the universal printer driver. The print queues that can be output to the printer 102 may include print queues of the specific printer driver 128. However, a user may not use highly advanced functions and want to use a simplified universal printer driver 127. Therefore, it is useful to provide a user interface (not illustrated) that enables users to determine whether to prioritize the universal printer driver over other printer driver.

In the present exemplary embodiment, if it is determined that the printer driver to be prioritized is the universal printer driver (YES in step S1006), the processing proceeds to step S1007. If it is determined that the printer driver to be prioritized is not the universal printer driver (NO in step S1006), the processing proceeds to step S1009.

Next, in step S1007, the driver management unit 1252 acquires a device model name of the print queue. Then, in step S1008, the driver management unit 1252 determines whether the acquired device model name is the name allocated to the universal printer driver. In general, users can change the print queue name. However, the device model name of the universal printer driver is a unique name, such as "Generic Device Model 1."

Therefore, it is feasible to identify the type of the driver with reference to the device model name of the print queue. If it is determined that the acquired device model name is the name for the universal printer driver (YES in step S1008), the processing proceeds to step S1009. If it is determined that the acquired device model name is not the name allocated to the universal printer driver (NO in step S1008), the processing proceeds to step S1010.

If the processing proceeds to step S1009, the driver management unit 1252 determines the print queue of the existing printer driver that corresponds to the port that coincides with the address information of the printer selected in step S1005, as an output destination. Subsequently, in step S1014, the driver management unit 1252 terminates the output preparation processing illustrated in FIG. 9.

If the processing proceeds to step S1010, namely if it is determined that the print queue of the specific printer driver that corresponds to the printer selected as an output target is already present, the driver management unit 1252 determines to install the universal printer driver. Then, the processing proceeds to step S1013. In step S1011, the driver management unit 1252 determines whether the printer driver to be prioritized is the universal printer driver, similar to the processing performed in step S1006.

If the printer driver to be prioritized is the universal printer driver (YES in step S1011), the processing proceeds to step S1010. If the printer driver to be prioritized is not the universal printer driver (NO in step S1011), the processing proceeds to step S1012. In step S1012, namely when there is not any existing print queue that can be output and the printer driver to be prioritized is not the universal printer driver, the driver management unit 1252 determines to search for an optimum specific printer driver suitable for the selected printer and installs the acquired specific printer driver. Subsequently, the processing proceeds to step S1013.

In step S1013, the driver management unit 1252 executes installation processing to install the printer driver of the type determined in step S1010 or in step S1012 (as described in detail with reference to the flowchart illustrated in FIG. 10).

In step S1014, the driver management unit 1252 terminates the output preparation processing illustrated in FIG. 9.

Figure 10:
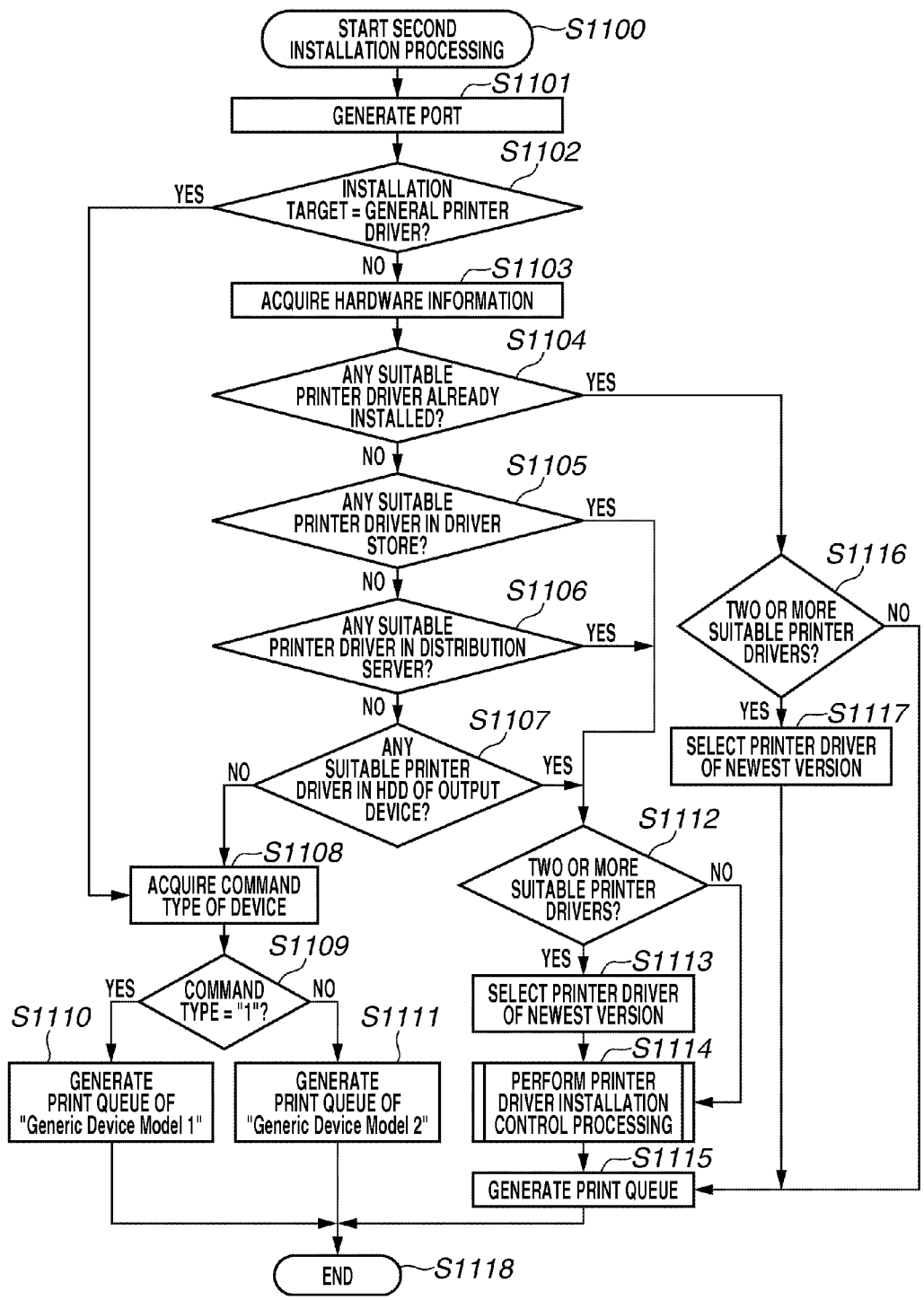
FIG. 10 is flowchart illustrating second installation processing (i.e., printer driver installation processing) according to the first exemplary embodiment of the present invention.

FIG. 10 is a flowchart illustrating details of the general or specific printer driver installation processing, which can be performed by the driver management unit 1252, according to the present exemplary embodiment. In the present exemplary embodiment, the processing illustrated in FIG. 10 is referred to as "second installation processing."

If in step S1100 the driver management unit 1252 starts the processing, then in step S1101, the driver management unit 1252 generates an output port. Next, in step S1102, the driver management unit 1252 determines whether the installation target is the universal printer driver, with reference to the result of determination in step S1010 or step S1012 illustrated in FIG. 9. If it is determined that the installation target is the universal printer driver (YES in step S1102), the processing proceeds to step S1108. If it is determined that the installation target is not the universal printer driver (NO in step S1102), the processing proceeds to step S1103.

In step S1103 to step S1107, the driver management unit 1252 searches the storage unit of any one of the host computer 101, the distribution server 103, and the printer 102a or 102b to find the optimum specific printer driver 143 that can be output. First, in step S1103, the driver management unit 1252 acquires hardware information of the printer. The hardware information acquired in the present exemplary embodiment is the hardware information usable in the plug-and-play installation. The hardware information acquired in this case is the information having been acquired in the printer search processing (see step S707) and extracted from the RAM 112.

Next, in step S1104, the driver management unit 1252 determines whether there is any suitable printer driver that has been already installed. More specifically, the driver management unit 1252 compares the hardware information of each printer driver registered in the OS 122 with the hardware information of the printer 102 acquired in step S1103. The driver management unit 1252 picks up all printer drivers that coincide with the hardware information acquired in step S1103. If at least one suitable printer driver is present (YES in step S1104), the processing proceeds to step S1116. If there is not any suitable printer driver (NO in step S1104), the processing proceeds to step S1105.

Next, in step S1105, the driver management unit 1252 determines whether there is any suitable printer driver managed by the Driver Store (i.e., a database system having been introduced for Windows Vista® and subsequent OS to manage device drivers). The Driver Store has the capability of storing the package of non-installed device drivers in the OS 122.

The driver management unit 1252 can inquire the OS 122 if there is any appropriate printer driver stored in the Driver Store that coincides with the hardware information of the printer 102 acquired in step S1103. As a result of the inquiry, if there is at least one suitable printer driver (YES in step S1105), the processing proceeds to step S1112. If there is not any suitable printer driver (NO in step S1105), the processing proceeds to step S1106.

Next, in step S1106, the driver management unit 1252 determines whether there is any suitable printer driver managed by the distribution server 103. The driver management unit 1252 can inquire the distribution server 103 if a printer driver suitable for the hardware information is present, via the network 104, using Remote Procedure Call (RPC) or Hyper Text Transfer Protocol (HTTP).

As a result of the inquiry, if there is at least one suitable printer driver (YES in step S1106), a printer driver package is transferred from the distribution server 103 to the host computer 101 and stored in the external memory 121. The processing proceeds to step S1112. If there is not any suitable printer driver (NO in step S1106), the processing proceeds to step S1107.

Next, in step S1107, the driver management unit 1252 determines whether there is any suitable printer driver that is managed by the printer 102. As described above, the printer 102 can store the specific printer driver 143 that is used to operate the printer itself in its external memory 134. The driver management unit 1252 can inquire the printer 102 if there is any suitable printer driver via the network 104, using the method similar to step S1106.

As a result of the inquiry, if at least one suitable printer driver is present (YES in step S1107), the data of the specific printer driver 143 is transferred from the printer 102 to the host computer 101 and stored in the external memory 121. Then, the processing proceeds to step S1112. If it is determined that there is not any suitable printer driver (NO in step S1107), for example, when the specific printer driver 143 has been deleted due to setting change of the external memory 134, the processing proceeds to step S1108.

The driver management unit 1252 performs print queue generation processing in step S1108 to step S1111 to generate a print queue of the universal printer driver installed beforehand in step S500 to step S516 when no suitable printer driver has been found as a result of the sequential processing performed in step S1103 to step S1106.

First, in step S1108, the driver management unit 1252 acquires command type information of the printer 102 via the network 104. In step S1109, the driver management unit 1252 determines whether the command type is "1." In the present exemplary embodiment, the command type information represents the type of the PDL 602 that can be processed by the printer 102. The universal printer driver is a printer driver that corresponds to a specific PDL capable of setting ordinary functions common to a plurality of device models. Accordingly, a different universal printer driver is prepared for a device model that supports a different PDL. Therefore, the driver management unit 1252 acquires the command type information and checks the compatibility.

In the present exemplary embodiment, it is assumed that the type of PDL that can be processed by the printer is "1" or "2." Therefore, the driver management unit 1252 determines whether the command type information is "1." If it is determined that the command type information is "1" (YES in step S1109), the processing proceeds to step S1110. If it is determined that the command type information is "2" (NO in step S1109), the processing proceeds to step S1111.

In step S1110, the driver management unit 1252 generates a print queue of "Generic Device Model 1" that corresponds to the command type "1." Subsequently, in step S1118, the driver management unit 1252 terminates the second installation processing illustrated in FIG. 10. On the other hand, in step S1111, the driver management unit 1252 generates a print queue of "Generic Device Model 2" that corresponds to the command type "2." Subsequently, in step S1118, the driver management unit 1252 terminates the second installation processing illustrated in FIG. 10. In this case, the driver management unit 1252 generates the print queue in association with the port generated in step S1101.

The driver management unit 1252 performs installation processing in step S1112 to step S1114 to install the suitable specific printer driver 143 found as a result of the sequential processing performed in step S1103 to step S1106.

First, in step S1112, the driver management unit 1252 determines whether two or more suitable printer drivers have been found. If it is determined that two or more suitable printer drivers have been found (YES in step S1112), the processing proceeds to step S1113. If it is determined that only one suitable printer driver has been found (NO in step S1112), the processing proceeds to step S1114.

In step S1113, the driver management unit 1252 selects a printer driver of the newest version as an installation target. The version information is allocated to each printer driver. Even when two printer drivers are identical to each other in device model, these printer drivers may be different inversion information if their manufacturing dates are different from each other. For example, according to an example version expressing method, a combination of date/time information and numerical value, such as "10/10/2008.2.5.0.0", is usable to explicitly indicate the newness of each driver.

Figure 8D:
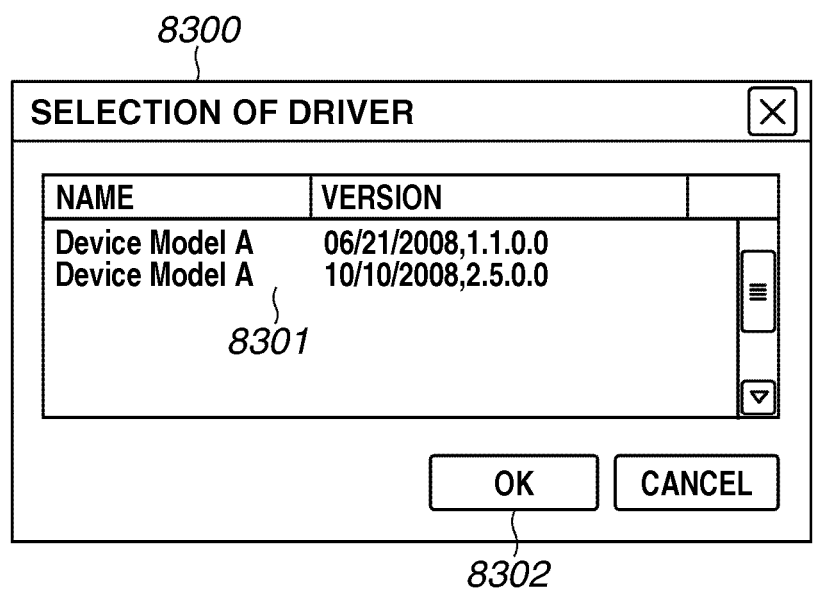

However, in a special occasion, a user may want to select a driver of an older version. In such a case, as illustrated in FIG. 8D, it is useful to display a UI 8300 that enables the user to select a desired driver. The UI 8300 includes a list field 8301 in which information (e.g., name and version) of a plurality of suitable printer drivers can be displayed. The user can select a desired printer driver from the list field 8301 and press an "OK" button 8302 to determine the printer driver to be selected. Subsequently, in step S1114, the driver management unit 1252 installs the only one suitable printer driver (if it is identified in step S1112) or the printer driver selected in step S1113 (when two or more printer drivers have been found) on the host computer.

The driver management unit 1252 performs processing in step S1116 to step S1117 when at least one suitable specific printer driver is already installed. The processing to be performed in step S1116 is similar to the processing performed in step S1112. The processing to be performed in step S1117 is similar to the processing performed in step S1113. In this case, step S1116 or step S1117 is not accompanied by a step comparable to step S1114 because there is not any printer driver to be installed.

In step S1115, the driver management unit 1252 generates a print queue in association with the port generated in step S1101. Then, in step S1118, the driver management unit 1252 terminates the second installation processing illustrated in FIG. 10.

In the above-described second installation processing, it is necessary to execute the printer driver installation processing (i.e., the processing to be performed in step S1114) in a process of the OS 122 that has administrator's authority. However, in many cases, the print performing application 123 is launched based on general user's authority. As a result, not only the virtual printer driver 126 (loaded by the application 123) but also the print job manager 125 operate based on general user's authority.

Therefore, the printer driver installation processing described in step S1114 of FIG. 10 cannot be realized. If the application 123 is always intended to operate based on administrator's authority when a user uses the system according to the present exemplary embodiment, the usability of the user will be greatly deteriorated. Therefore, the present exemplary embodiment intends to provide a method for realizing the installation processing to be performed in step S1114 even in a case where the application operates based on general user's authority.

Figure 11:
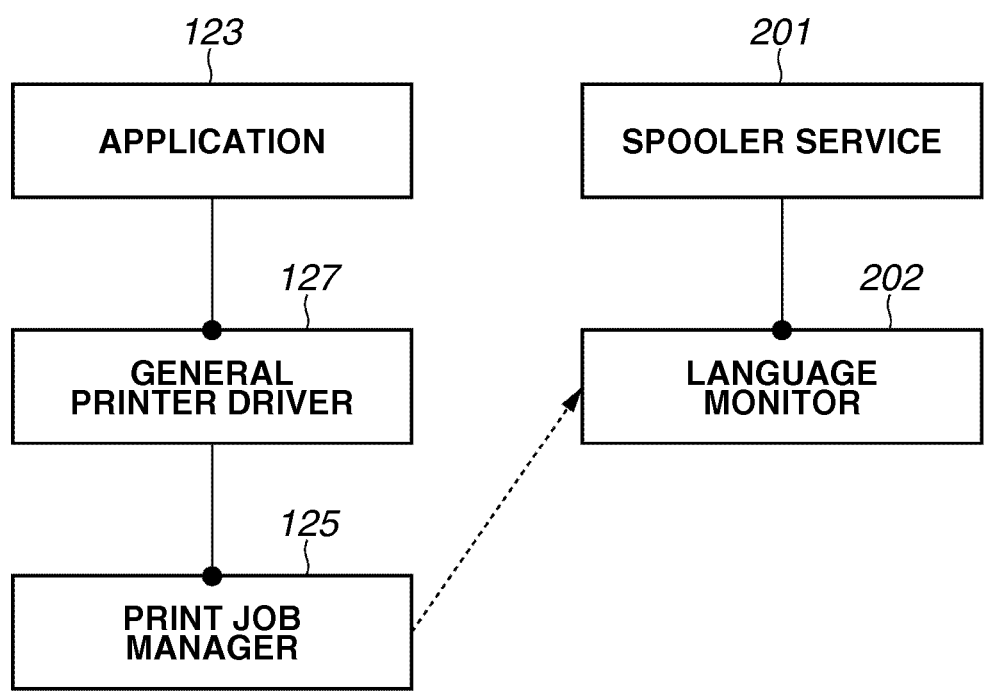
FIG. 11 illustrates components relating to the installation processing according to the first exemplary embodiment of the present invention.

FIG. 11 schematically illustrates components relating to the authority-based installation control processing (described in detail below with reference to a flowchart illustrated in FIG. 12), which are classified for respective execution processes.

A spooler service 201 is a component capable of controlling the print processing, which is provided as a partial function of the OS 122. A language monitor 202 is a component capable of communicating with a peripheral device (such as a printer). The language monitor 202 is included in the package of the virtual printer driver 126. When the printer driver 126 is installed, the printer driver 126 is registered in the OS 122 and managed by the spooler service 201.

The virtual printer driver 126 and the print job manager 125 are loaded by the application 123 according to the print flow described in FIG. 7 and are operable based on authority comparable to that of the application 123. On the other hand, the language monitor 202 is loaded and operable in a process of the spooler service 201 that is always launched based on administrator's authority.

The spooler service 201 is launched when the OS 122 starts its operation and is continuously stationed until the OS 122 terminates the operation. As a result, the language monitor 202 is constantly held in the loaded state. Bidi API is an appropriate interface usable to call the functions of the language monitor 202. The Bidi API is described in detail below.

Figure 12:
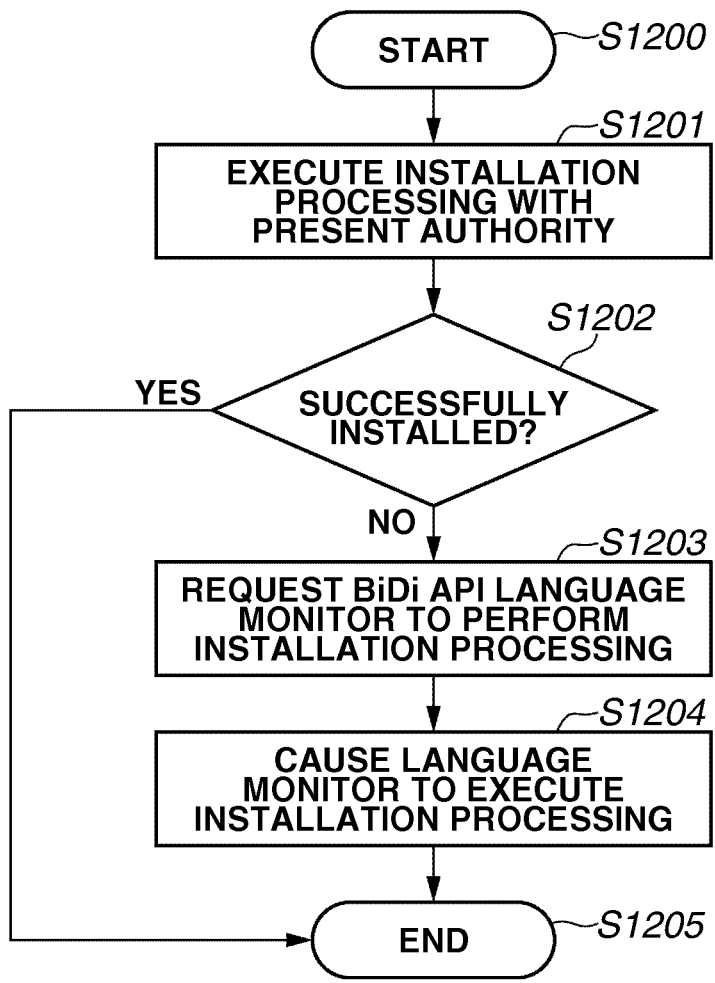
FIG. 12 is a flowchart illustrating third installation processing (i.e., authority-based installation processing) according to the first exemplary embodiment of the present invention.

FIG. 12 is a flowchart illustrating example installation control processing to be performed considering the authority.

In the present exemplary embodiment, the processing illustrated in FIG. 12 is referred to as third installation processing.

If in step S1200 the driver management unit 1252 starts the processing, then in step S1201, the driver management unit 1252 executes installation processing based on the present authority. As described above, when the present authority includes administrator's authority, the installation processing can be successfully completed. On the other hand, the successfulness of the installation processing depends on the OS version or its settings. Therefore, it is difficult to predict whether the present process is installable.

This is why the driver management unit 1252 executes the installation processing based on the present authority, as an initial trial. Then, in step S1202, the driver management unit 1252 determines whether the installation processing has been successfully completed. In this case, it is useful to check a return value of the API prepared to execute the installation processing to determine whether the installation processing has been successfully completed. If the installation processing has been successfully completed (YES in step S1202), the processing proceeds to step S1205. The driver management unit 1252 terminates the processing of the flowchart illustrated in FIG. 12. If the installation processing has been failed (NO in step S1202), the processing proceeds to step S1203.

In step S1203, the driver management unit 1252 requests the language monitor to perform the installation processing, using the BiDi API.

In the present exemplary embodiment, the BiDi API is an interface prepared to enable the application to communicate with an output destination device of the printer driver via the language monitor. The language monitor 202 is loaded by the spooler service 201. Therefore, the BiDi API serves as an actual interface to the spooler service 201. Accordingly, when the application calls the BiDi API, the application performs interprocess communications with the spooler service 201.

The functions that the BiDi API provides beforehand include a method for transmitting and receiving XML data. More specifically, the BiDi API enables to transmit and receive XML data of a request determined beforehand between an application to be called and the language monitor as well as XML data of a corresponding response.

FIG. 13A illustrates an example of the request transmitted from the driver management unit 1252 to the language monitor. FIG. 13B illustrates an example of the response returned from the language monitor to the driver management unit 1252. In the present exemplary embodiment, both the request and the response are XML format data. The BiDi API is inherently usable for communications with other device. However, the examples illustrated in FIGS. 13A and 13B do not include such information. In the present exemplary embodiment, the language monitor 202 is functionally operable as a processing component operable based on administrator's authority, not the communication intervening component.

The request illustrated in FIG. 13A includes an InffilePath element, which designates a value indicating the location of a driver package. The location of the driver package designated in this case indicates the location of a driver package file of the printer driver found in step S1105 to step S1107. Further, the request illustrated in FIG. 13A includes a ModelName element, which designates a value of an installed model name.

If the language monitor 202 receives the request illustrated in FIG. 13A, then in step S1204, the language monitor 202 performs printer driver installation processing based on the received request. Then, the language monitor 202 returns a processing result, as the response illustrated in FIG. 13B, via the Bidi API. The response illustrated in FIG. 13B includes a ModelName element, in which the value of the installed model name is stored. In step S1205, the driver management unit 1252 terminates the processing of the flowchart illustrated in FIG. 12.

The setting processing of a device driver to use a peripheral device is not limited to the installation processing. For example, administrator's authority may be required to realize the port generation processing in step S1101 or the queue generation processing in step S1110, step S1111, and step S1115. In this case, a method using the above-described language monitor can be applied to the port or print queue generation processing. The generation of a port or a print queue can be realized even when the print job manager 125 is loaded based on general user's authority.

In the present exemplary embodiment, instead of using the language monitor, a dedicated component operable based on administrator's authority can be prepared separately to realize installation processing similar to the processing described with reference to FIG. 12. However, in view of the following points, it is desired to use the language monitor.

First, using the language monitor is advantageous in that the language monitor is automatically installed together with the printer driver package. Therefore, it is unnecessary to provide a dedicated component installation program to set up the language monitor on the host computer.

Second, the dedicated component may be targeted as a suspicious software program if a severe security system (including a general antivirus software program) is introduced to enhance the system environment. In such a case, the setup of the dedicated component will fail. On the other hand, the language monitor is generally set up as a component operable as a part of the spooler service when the printer driver (e.g., the virtual printer driver in the present exemplary embodiment) is installed. Therefore, the language monitor can be surely introduced to the host computer.

The present invention is employable even when the spooler service itself is expanded or when another component, which can be loaded by a module operable based on administrator's authority in the printing system, such as the spooler service, can be used in the same manner as the language monitor. More specifically, any other appropriate component (such as a port monitor or a print processor) is usable to realize the processing illustrated in FIG. 12 according to the present exemplary embodiment.

Next, a network system according to the second exemplary embodiment of the present invention is described below with reference to attached drawings.

The system described in the first exemplary embodiment is characterized in that the host computer enables a user to designate an output destination and instruct a printing operation. On the contrary, the system according to the second exemplary embodiment is an authentication printing system, in which a user of the host computer is only needed to instruct a print operation while the output destination is determined based on authentication that can be performed by an authentication unit, such as a card reader associated with a peripheral device (e.g., a printer).

Figure 14A:
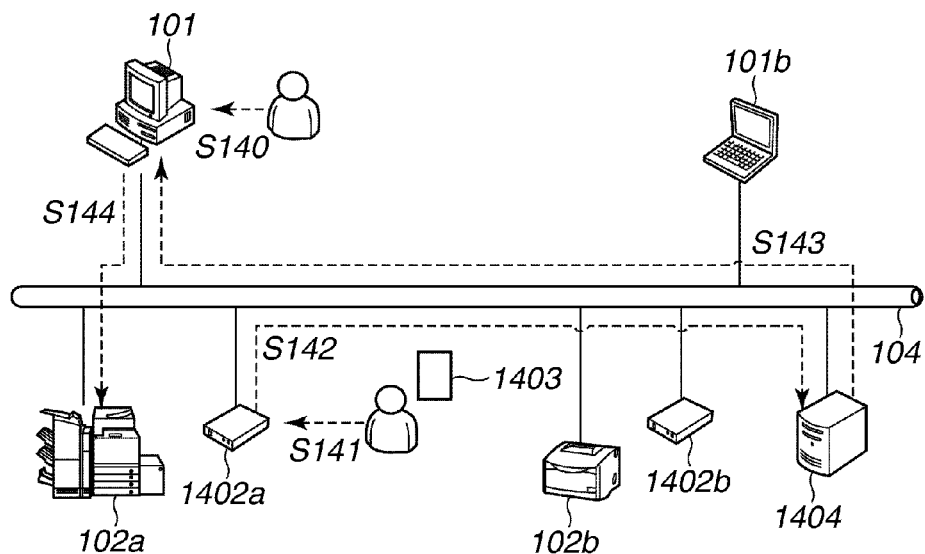
FIG. 14A illustrates a schematic configuration of a network system according to a second exemplary embodiment of the present invention.

FIG. 14A illustrates a schematic configuration of a network system according to the second exemplary embodiment of the present invention. The network system illustrated in FIG. 14A includes a plurality of the host computers 101a and 101b, a plurality of printers 102a and 102b, a plurality of authentication units 1402a and 1402b, an integrated circuit (IC) card 1403, and an authentication server 1404, which are connected to each other via a network 104.

The host computer 101 (101a and 101b) and the printer 102 (102a and 102b) have configurations similar to those described in FIG. 1B. In the present exemplary embodiment, the authentication unit 1402 (1402a and 1402b) is used to identify the printer 102 to be used by a user. Therefore, the authentication unit is adjacent to the printer in physical setup position. In the present exemplary embodiment, the printer and the authentication unit are independent and separate units. However, a printer may have additional functions comparable to those of the authentication unit.

First, the system according to the second exemplary embodiment is described in detail below with reference to an example flow of the printing work, prior to a detailed description of each apparatus that constitutes the system.

If in step S140 the host computer 101a accepts a print execution instruction from a user, the host computer 101a executes print processing without identifying any output target printer and stores a print job having an intermediate format (e.g., an input EMF format). Next, in step S141, the user sets the IC card 1403 to select the output printer 102a. Then, in step S142, the authentication unit 1402a reads an IC card unique identifier (ID) from the IC card 1403 and transmits the read ID information to the authentication server 1404.

In step S143, the authentication server 1404 transmits the network address of the printer 102a to the host computer 101a that is associated with the received ID.

The host computer 101a converts the intermediate data stored beforehand into a printer unique PDL, if necessary, and outputs the PDL to the received network address of the printer 102a.

Next, each apparatus that constitutes the network system illustrated in FIG. 14A according to the present exemplary embodiment is described in detail below.

The authentication unit 1402 is described in detail below. The authentication units 1402a and 1402b are terminals capable of performing authentication processing based on information obtainable from the IC card 1403 and capable of executing authentication print processing. In the present exemplary embodiment, the authentication unit 1402 (1402a and 1402b) is usable to identify a printer as an output destination of the print job having been stored beforehand in the host computer. Each authentication unit and a corresponding output printer are intended to be present together as a pair. In FIG. 14A, the printer 102a is associated with the authentication unit 1402a. The printer 102b is associated with the authentication unit 1402b.

The association between the printer and its corresponding authentication unit can be realized by storing relevant information in the authentication unit. However, in the present exemplary embodiment, the authentication server 1404 has the role of associating the printer with its corresponding authentication unit as described below.

Figure 14B:
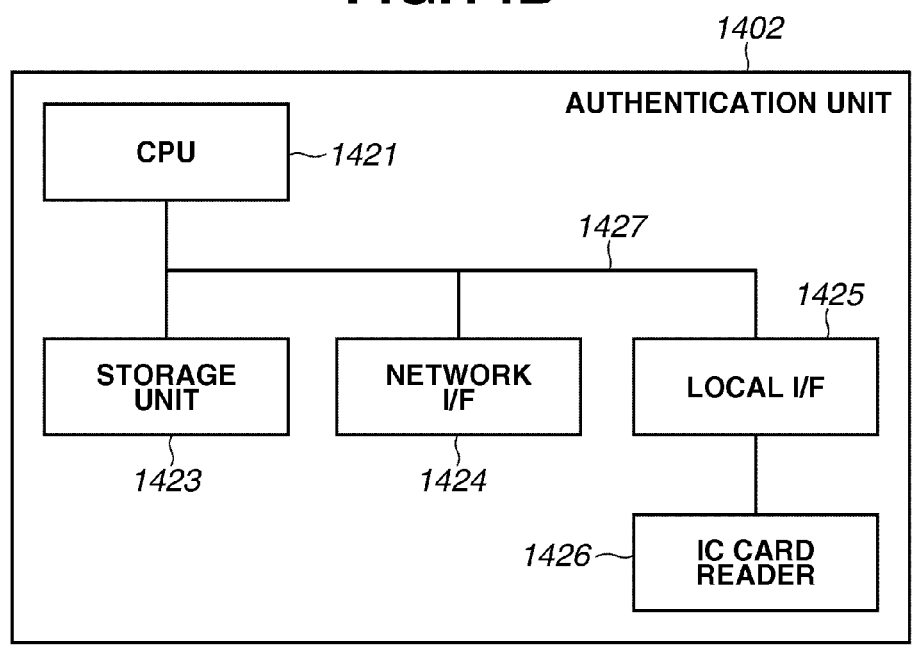
FIG. 14B is a block diagram illustrating a configuration of an authentication unit according to the second exemplary embodiment of the present invention.

FIG. 14B is a block diagram illustrating an example of a schematic configuration of the authentication unit 1402. The authentication unit 1402 includes a CPU 1421, a storage unit 1423 (e.g., RAM or ROM), a network I/F 1424, and a local I/F 1425, which are connected to each other via a system bus 1427. Further, the authentication unit 1402 includes an IC card reader 1426 that is connected to the local I/F 1425. The authentication unit 1402 can realize an authentication function based on an authentication program stored in the storage unit and executed by the CPU 1421.

The CPU 1421 is a central processing unit that can control various operations to be performed by the authentication unit 1402. The storage unit 1423 stores network address of the authentication server 1404, which is input in the initial setting of the authentication unit 1402, in addition to the authentication program.

The IC card reader 1426 reads unique identification information from the IC card. In the present exemplary embodiment, the IC card reader 1426 is a reading device applicable to a non-contact type IC card (e.g., Felica®), although any other device capable of acquiring unique identification information is employable.

For example, the IC card reader can be replaced by a biometric authentication sensor (e.g., a fingerprint sensor). In the present exemplary embodiment, the IC card reader 1426 is not directly connected to the system bus 1427. More specifically, the IC card reader 1426 is connected to the system bus 1427 via the local I/F 1425 so that the authentication unit can be flexibly changed.

The authentication unit 1402 can realize authentication function in association with an external device by transmitting ID information acquired via the IC card reader 1426 to the authentication server 1404 via the network I/F 1424.

The authentication server 1404 is described in detail below. The authentication server 1404 stores information 1501 illustrated in FIG. 15A, which is a combination of ID information of the IC card and the network address of the host computer. Further, the authentication server 1404 stores information 1502 illustrated in FIG. 15B, which is a combination of the network address of the authentication unit and the network address of the output device.

When the authentication server 1404 manages the information illustrated in FIGS. 15A and 15B in a unified fashion, the authentication print can be realized under the cooperation of the host computer, the printer, and authentication unit.

If the authentication server 1404 receives ID information of the IC card 1403 from the authentication unit 142a, the authentication server 1404 obtains a network address (192.168.0.2) of the host computer 101a associated with the ID information (1626965094006786657) with reference to the combined information 1501 illustrated in FIG. 15A. Further, the authentication server 1404 receives a network address (192.168.0.16) of the authentication unit 1402a together with the ID information. Therefore, the authentication server 1404 obtains network address (192.168.0.48) of the printer 102a associated with the authentication unit 1402a with reference to the combined information 1502 illustrated in FIG. 15B.

Then, the authentication server 1404 transmits the obtained network address (192.168.0.48) of the printer 102a to the host computer 101a. The host computer 101a acquires information of an output target printer with reference to the received network address of the printer 102a, and can install a printer driver. Further, the host computer 101a can transmit a list of jobs held in the host computer 101a to the printer 102a to promote a job transfer responding to a request from the printer.

In the first exemplary embodiment, the print job manager 125 has played a central role in the print processing or in the installation processing. On the other hand, in the second exemplary embodiment, the authentication job manager 130 plays a central role in various processing.

An example sequence of the processing that can be performed by print processing related programs including the authentication job manager 130 is described below with reference to a diagram illustrated in FIG. 16.

Print processing in step S801 to step S806 to be performed by the application 123 and the virtual printer driver 126 is similar to the processing performed in step S700 to step S706 described in the first exemplary embodiment with reference to in FIG. 7, although a program to be launched in step S802 is the authentication job manager 130. If a user requests the virtual printer driver to perform print processing repetitively, a plurality of EMF format print jobs is held in the host computer.

The authentication job manager 130 includes three components, including a printer driver management processing unit 1252 and a despool processing unit 1253 that are similar to those of the print job manager 125 described in the first exemplary embodiment. The remaining component of the authentication job manager 130 is a communication processing unit 1301 (i.e., a component peculiar to the authentication job manager 130), which can communicate with the authentication unit 1402 and can control the printer driver management processing unit 1252 and the despool processing unit 1253.

If the authentication job manager 130 is launched in step S802, then in step S807, the communication processing unit 1301 executes reception standby processing to control the network I/F 118 of the host computer 101 so that information transmitted from the authentication server 1404 can be received. The OS 122 provides an API function to realize the control of the network I/F 118. An example of the API is Winsock. If a memory position of the EMF is notified in step S806 and the reception standby processing is executed in step S807, the job is held in the host computer 101 until a user performs an authentication operation (namely, the communication processing unit 1301 is brought into a standby state).

Next, if in step S141 the user performs the authentication operation based on information obtainable from the IC card 1403, then in step S142, the authentication unit 1402 reads the card ID and transmits the acquired card ID information to the authentication server 1404. Next, in step S143, the authentication server 1404 transmits the network address of the printer 102 (i.e., the output destination address) obtained based on the combined information 1502 stored beforehand to the host computer 101. The processing to be performed in step S141 to step S143 has been already described with reference to FIGS. 15A and 15B. At the same time, the authentication server 1404 identifies a user's print target job to be printed by the printer and notifies the identified job as a print request to the authentication job manager 130.

Next, if the communication processing unit 1301 of the authentication job manager 130 receives the network address of the printer 102 (i.e., the output destination address) from the authentication server 1404, then in step S808, the communication processing unit 1301 acquires device information of the output destination printer. The acquisition processing in step S808 is similar to the printer search processing in step S707 and is performed for the single printer 102. More specifically, in step S707, hardware information of the printer is acquired using the SNMP protocol according to an appropriate communication method (e.g., broadcast). On the other hand, in step S808, the communication processing unit 1301 acquires hardware information exclusively from the printer 102.

Next, in step S809, the communication processing unit 1301 requests output preparation processing in the same manner as the processing performed in step S710 in the first exemplary embodiment. Further, in step S810, the printer driver management processing unit 1252 performs the output preparation processing in the same manner as the processing performed in step S711 in the first exemplary embodiment.

Even in the present exemplary embodiment, if the authentication job manager 130 is launched based on user's authority, not based on administrator's authority, installation processing of a printer driver of the printer identified by the address notified in step S143 may fail. Hence, in the second exemplary embodiment, the output preparation processing step S810 includes the third installation processing (see step S1200 to step S1205) as installation processing peculiar to the present invention, which has been described in the first exemplary embodiment.

If in step S810 the installation of the specific printer driver has been successfully completed, then in step S811, the communication processing unit 1301 instructs the despool processing unit 1253 to start print processing.

In step S812, the despool processing unit 1253 performs despool processing that is similar to the processing in step S715 described in the first exemplary embodiment. In step S813, the specific printer driver 128 performs PDL generation transmission processing that is similar to the processing in step S716 described in the first exemplary embodiment. The print job of the generated PDL is transmitted to the printer 102 that has transmitted the network address. The printer 102 performs print processing.

As described above, the network system according to the second exemplary embodiment enables a user to authenticate a print job held in the host computer at an arbitrary printer setup location and perform a print operation. In particular, when a print request of the job having been held in the host computer is received from the printer, a corresponding printer driver is automatically installed on the host computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2011-070370 filed Mar. 28, 2011 and No. 2011-159010 filed Jul. 20, 2011, which are hereby incorporated by reference herein in their entirety.

What is claimed is:

1. An information processing apparatus, in which an operating system (OS) is executable in such a way that a component operable based on administrator's authority can realize installation of a device driver, the information processing apparatus comprising a selection unit configured to select a peripheral device that serves as an output destination of a processing request if the processing request is received from a user via an application; and a management unit configured to control installation of a device driver applicable to the selected peripheral device to use the peripheral device, wherein the management unit is configured to request a first component operable on the OS based on administrator's authority to perform installation of a device driver applicable to the selected peripheral device, wherein the first component is a component to be set up in such a way as to be managed by a spooler service as a second component operable based on administrator's authority, which is provided as a part of functions of the OS, wherein when a driver selected by the user is a virtual driver having been installed without identifying any output destination of the processing request, the selection unit is configured to select the peripheral device that serves as the output destination of the processing request, and wherein the first component is a component to be set up in such a way as to be managed by the second component when the virtual driver is installed.

2. The information processing apparatus according to claim 1, wherein the management unit is further configured to request the first component to perform setting processing for the installed device driver applicable to the selected peripheral device, and the setting processing for the installed device driver includes at least one of generation of a port of the device driver and generation of a queue that corresponds to the selected peripheral device.

3. The information processing apparatus according to claim 1, wherein the first component is a language monitor loaded by the spooler service.

4. The information processing apparatus according to claim 1, wherein a universal printer driver applicable to a plurality of device models is installed when the virtual driver is installed, and the management unit is configured to request the first component to generate a port of the universal printer driver to use the selected peripheral device.

5. The information processing apparatus according to claim 1, wherein the management unit is configured to execute the installation of the device driver applicable to the selected peripheral device based on present authority, before requesting the first component to perform the installation of the device driver applicable to the selected peripheral device.

6. A method for controlling an information processing apparatus, in which an operating system (OS) is executable in such a way that a component operable based on administrator's authority can realize installation of a device driver, the method comprising:

selecting a peripheral device that serves as an output destination of a processing request if the processing request is received from a user via an application; and controlling installation of a device driver applicable to the selected peripheral device to use the peripheral device, wherein the method further comprises requesting a first component operable on the OS based on administrator's authority to perform installation of a device driver applicable to the selected peripheral device, wherein the first component is a component to be set up in such a way as to be managed by a spooler service as a second component operable based on administrator's authority, which is provided as a part of functions of the OS, wherein when a driver selected by the user is a virtual driver having been installed without identifying any output destination of the processing request, the selecting selects the peripheral device that serves as the output destination of the processing request, and wherein the first component is a component to be set up in such a way as to be managed by the second component when the virtual driver is installed.

7. A computer readable non-transitory storage medium storing a computer program that causes a computer to control an information processing apparatus in which an operating system (OS) is executable in such a way that a component operable based on administrator's authority can realize installation of a device driver, the program comprising:

computer-executable instructions for selecting a peripheral device that serves as an output destination of a processing request if the processing request is received from a user via an application; and computer-executable instructions for controlling installation of a device driver applicable to the selected peripheral device to use the peripheral device, wherein the program further comprises computer-executable instructions for requesting a first component operable on the OS based on administrator's authority to perform installation of a device driver applicable to the selected peripheral device, wherein the first component is a component to be set up in such a way as to be managed by a spooler service as a second component operable based on administrator's authority, which is provided as a part of functions of the OS, wherein when a driver selected by the user is a virtual driver having been installed without identifying any output destination of the processing request, the instructions for selecting select the peripheral device that serves as the output destination of the processing request, and wherein the first component is a component to be set up in such a way as to be managed by the second component when the virtual driver is installed.

8. A printing system including an information processing apparatus, in which an operating system (OS) is executable in such a way that a component operable based on administrator's authority can realize installation of a printer driver, in addition to a printer, the printing system comprising:

a holding unit configured to hold intermediate format data, as a print target, if a print instruction is received from a user via an application;

a reception unit configured to receive a print request including printer information from the printer;

a management unit configured to control installation of a printer driver applicable to the printer based on the received printer information; and a transmission unit configured to transmit a print job, which can be generated based on the stored intermediate format data using the installed printer driver, to the printer, wherein the management unit is configured to request, after the intermediate format data is held by the holding unit, a component operable on the OS based on administrator's authority to perform the installation of the printer driver applicable to the printer, wherein when the printer driver is a virtual driver having been installed without identifying any output destination of the print request, the printer serves as the output destination of the print request, and wherein the component is a first component to be set up in such a way as to be managed by a second component when the virtual driver is installed.

9. The printing system according to claim 8, wherein the management unit is further configured to request the first component to perform setting processing for the installed device driver applicable to the selected peripheral device, and the setting processing for the installed printer driver includes at least one of generation of a port of the printer driver and generation of a queue that corresponds to the printer.

10. A method for controlling a printing system including an information processing apparatus, in which an operating system (OS) is executable in such a way that a component operable based on administrator's authority can realize installation of a printer driver, in addition to a printer, the method comprising:

holding intermediate format data, as a print target, if a print instruction is received from a user via an application;

receiving a print request including printer information from the printer;

controlling installation of a printer driver applicable to the printer based on the received printer information; and transmitting a print job, which can be generated based on the stored intermediate format data using the installed printer driver, to the printer, wherein the method further comprises requesting, after the intermediate format data is held, a component operable on the OS based on administrator's authority to perform the installation of a printer driver applicable to the printer, wherein when the printer driver is a virtual driver having been installed without identifying any output destination of the print request, the printer serves as the output destination of the print request, and wherein the component is a first component to be set up in such a way as to be managed by a second component when the virtual driver is installed.

* * * * *